(12) United States Patent
O'Neill et al.

(10) Patent No.: US 11,723,426 B2
(45) Date of Patent: *Aug. 15, 2023

(54) BASE TEMPLATES FOR MANY FINISHES BY LASER

(71) Applicant: Levi Strauss & Co., San Francisco, CA (US)

(72) Inventors: Elizabeth O'Neill, Tiburon, CA (US); James Barton Sights, San Francisco, CA (US); Jeff Zens, Emeryville, CA (US); David Love, Tiburon, CA (US)

(73) Assignee: Levi Strauss & Co., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/650,375

(22) Filed: Feb. 8, 2022

(65) Prior Publication Data

US 2022/0225715 A1 Jul. 21, 2022

Related U.S. Application Data

(62) Division of application No. 15/841,268, filed on Dec. 13, 2017, now Pat. No. 11,241,053.

(60) Provisional application No. 62/433,746, filed on Dec. 13, 2016.

(51) Int. Cl.
| | | |
|---|---|---|
| *A41H 3/00* | (2006.01) |
| *A41H 3/08* | (2006.01) |
| *D03D 1/00* | (2006.01) |
| *D06C 23/02* | (2006.01) |
| *D06P 5/13* | (2006.01) |
| *D06P 5/15* | (2006.01) |
| *D06P 5/20* | (2006.01) |
| *A41H 42/00* | (2006.01) |
| *D06B 11/00* | (2006.01) |
| *D06L 4/20* | (2017.01) |
| *D03D 15/54* | (2021.01) |
| *D04H 1/02* | (2006.01) |
| *G06Q 30/00* | (2023.01) |
| *D06L 4/70* | (2017.01) |
| *G06Q 30/0601* | (2023.01) |
| *D06M 10/00* | (2006.01) |
| *G06F 16/951* | (2019.01) |
| *A41D 1/06* | (2006.01) |
| *G06Q 10/087* | (2023.01) |

(52) U.S. Cl.
CPC .............. *A41H 3/007* (2013.01); *A41H 3/08* (2013.01); *A41H 42/00* (2013.01); *D03D 1/00* (2013.01); *D03D 15/54* (2021.01); *D04H 1/02* (2013.01); *D06B 11/0096* (2013.01); *D06C 23/02* (2013.01); *D06L 4/20* (2017.01); *D06L 4/70* (2017.01); *D06M 10/005* (2013.01); *D06P 5/132* (2013.01); *D06P 5/137* (2013.01); *D06P 5/153* (2013.01); *D06P 5/158* (2013.01); *D06P 5/2005* (2013.01); *G06Q 30/0621* (2013.01); *A41D 1/06* (2013.01); *D05D 2305/08* (2013.01); *D05D 2305/24* (2013.01); *D06C 2700/31* (2013.01); *D10B 2501/00* (2013.01); *G06F 16/951* (2019.01); *G06Q 10/087* (2013.01)

(58) Field of Classification Search
CPC .......... D06P 5/132; D06P 5/137; D06P 5/153; D06P 5/158; D06P 5/2005; D06M 10/005; D06B 11/0096; A41H 3/007; A41H 3/08; A41H 42/00; D06L 4/70; D06L 4/20; D03D 15/54; D03D 1/00; D04H 1/02; D06C 23/02; G06Q 30/0061
See application file for complete search history.

(56) References Cited

U.S. PATENT DOCUMENTS

| | | | |
|---|---|---|---|
| 5,567,207 A | 10/1996 | Lockman et al. | |
| 5,647,875 A * | 7/1997 | Dixon | D06P 1/228 8/642 |
| 6,819,972 B1 | 11/2004 | Martin et al. | |
| 11,241,055 B2 * | 2/2022 | Love | D06P 5/132 |
| 11,299,832 B2 * | 4/2022 | Samarasinghe | D06M 10/005 |
| 11,484,080 B2 * | 11/2022 | Bell | G06F 3/04847 |
| 2014/0277663 A1 | 9/2014 | Gupta et al. | |
| 2016/0263928 A1 * | 9/2016 | Costin, Jr. | D06P 5/2005 |
| 2018/0291553 A1 * | 10/2018 | Schimper | D06P 1/46 |

FOREIGN PATENT DOCUMENTS

| | | |
|---|---|---|
| WO | WO/2001/025824 | 4/2001 |
| WO | WO/2015/042441 | 3/2015 |

OTHER PUBLICATIONS

Tytti Alapieti, "Creating an Efficient and Scalable Manufacturing System for Customized Made-To-Measure Jeans", Master of Science thesis, 102 pgs., Tampere University of Technology, Finland, 2012, published online at: https://trepo.tuni.fi// handle/123456789/21068.*

International Search Report, PCT Application PCT/US2017/066228, dated Mar. 28, 2018, 3 pages.

* cited by examiner

*Primary Examiner* — Amina S Khan
(74) *Attorney, Agent, or Firm* — Aka Chan LLP

(57) ABSTRACT

Laser finishing of apparel products allows an operating model that reduces finishing cost, lowers carrying costs, increases productivity, shortens time to market, be more reactive to trends, reduce product constraints, reduces lost sales and dilution, and more. Improved aspects include design, development, planning, merchandising, selling, making, and delivering. The model uses fabric templates, each of which can be used to produce a multitude of laser finishes. Operational efficiency is improved.

20 Claims, 17 Drawing Sheets

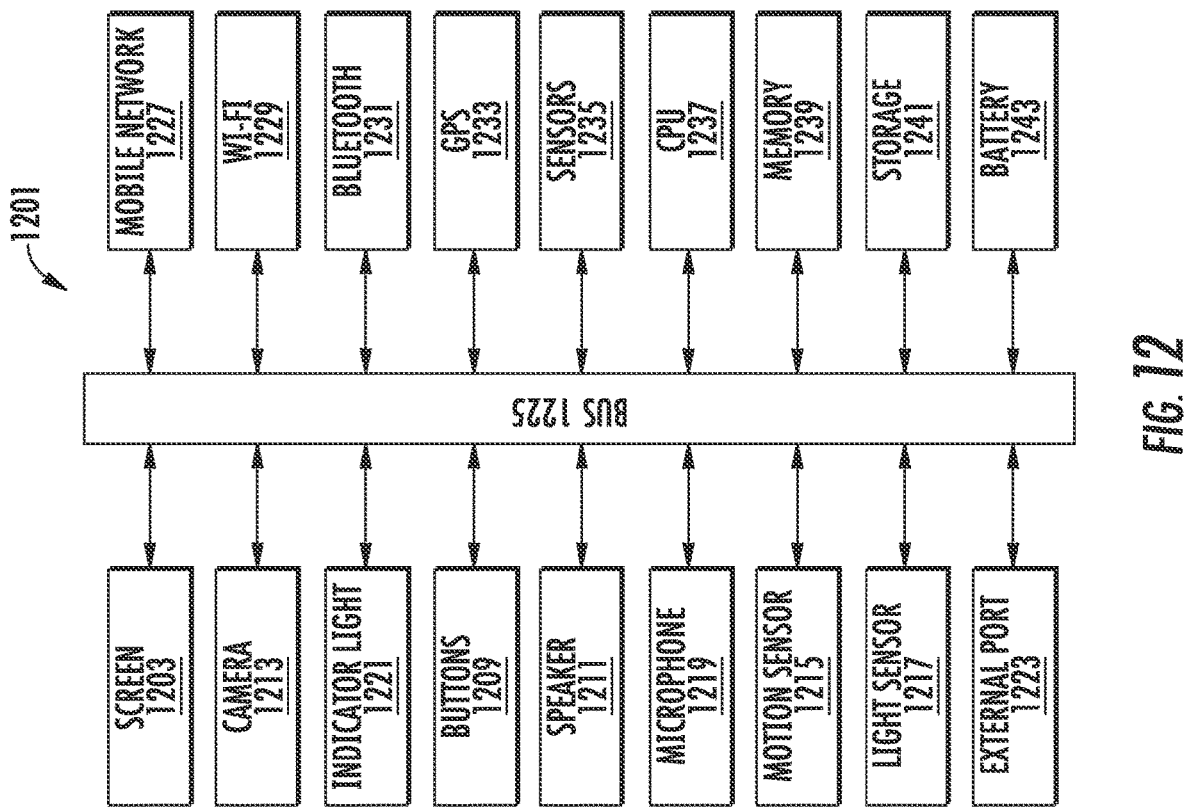
FIG. 12
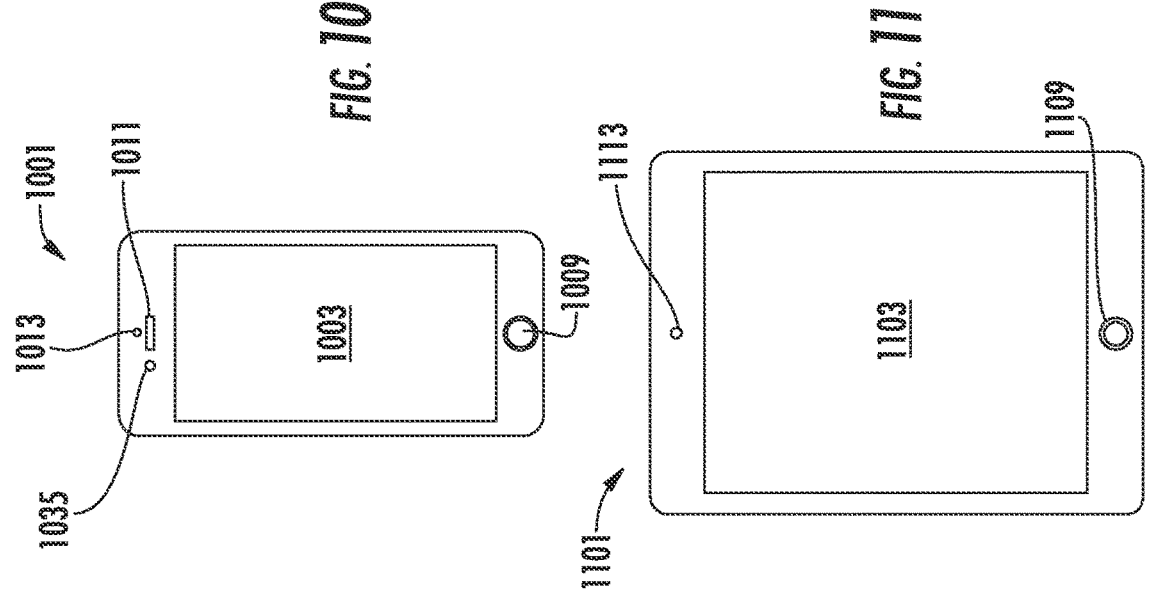
FIG. 10
FIG. 11

BASE TEMPLATES FOR MANY FINISHES BY LASER

CROSS-REFERENCE TO RELATED APPLICATIONS

This patent application is a divisional U.S. patent application Ser. No. 15/841,268, filed Dec. 13, 2017, issued as U.S. Pat. No. 11,241,053 on Feb. 8, 2022, which claims the benefit of U.S. patent application 62/433,746, filed Dec. 13, 2016. These applications are incorporated by reference along with all other references cited in this application.

BACKGROUND OF THE INVENTION

The present invention relates to textiles and, more specifically, to techniques for various aspects of laser finishing of apparel products including designing, developing, planning, merchandising, selling, making, and delivering of such products. These products include denim apparel such as jeans, shirts, shorts, jackets, vests, and skirts, where laser finishing is used to produce a faded, distressed, washed, or worn finish or appearance.

In 1853, during the California Gold Rush, Levi Strauss, a 24-year-old German immigrant, left New York for San Francisco with a small supply of dry goods with the intention of opening a branch of his brother's New York dry goods business. Shortly after arriving in San Francisco, Mr. Strauss realized that the miners and prospectors (called the "forty niners") needed pants strong enough to last through the hard work conditions they endured. So, Mr. Strauss developed the now familiar jeans which he sold to the miners. The company he founded, Levi Strauss & Co., still sells jeans and is the most widely known jeans brand in the world. Levi's is a trademark of Levi Strauss & Co.

Though jeans at the time of the Gold Rush were used as work clothes, jeans have evolved to be fashionably worn everyday by men and women, showing up on billboards, television commercials, and fashion runways. Fashion is one of the largest consumer industries in the U.S. and around the world. Jeans and related apparel are a significant segment of the industry.

As fashion, people are concerned with the appearance of their jeans. Many people desire a faded or worn blue jeans look. In the past, jeans became faded or distressed through normal wash and wear. The apparel industry recognized people's desire for the worn blue jeans look and began producing jeans and apparel with different wear patterns. The wear patterns have become part of the jeans style and fashion. Some examples of wear patterns include combs or honeycombs, whiskers, stacks, and train tracks.

Despite the widespread success jeans have enjoyed, the process to produce modern jeans with wear patterns takes processing time, has relatively high processing cost, and is resource intensive. A typical process to produce jeans uses significant amounts of water, chemicals (e.g., bleaching or oxidizing agents), ozone, enzymes, and pumice stone. For example, it may take from about 20 to 60 liters of water to finish each pair of jeans.

Therefore, there is a need for improved techniques to accommodate laser finishing for jeans and other apparel, which will reduce environmental impact, processing time, and processing costs, while maintaining the look and style of traditional finishing techniques.

BRIEF SUMMARY OF THE INVENTION

Laser finishing of apparel products allows an operating model that reduces finishing cost, lowers carrying costs, increases productivity, shortens time to market, be more reactive to trends, reduce product constraints, reduces lost sales and dilution, and more. Improved aspects include design, development, planning, merchandising, selling, making, and delivering. The model uses fabric templates, each of which can be used be produce a multitude of laser finishes. Operational efficiency is improved.

In an implementation, a system includes a first garment product, second garment product, digital design tool, and a laser finishing machine. The first garment is identifiable by a first product code identifier. The second garment product is identifiable by a second product code identifier. The digital design tool is used to generate or produce one or more laser files, including a first laser file for a first finishing pattern. The laser finishing machine receives as input the first laser file that is generated by the digital design tool.

When the first garment template is used as a target garment for a laser head of the laser finishing machine and the first laser file controls operation of the laser head, the laser finishing machine burns the first finishing pattern on the target garment, which results in the target garment becoming the first garment product. When the second garment template is used as the target garment for the laser head of the laser finishing machine and the first laser file controls operation of the laser head, the laser finishing machine burns the finishing pattern on the target garment, which results in the target garment becoming the second garment product.

In an implementation, a method includes: providing a first garment template washed using a first base wash recipe; providing a second garment template washed using a second base wash recipe; providing a first laser file including a first finishing pattern; and inputting the first laser file to a laser finishing machine to burn the first finishing pattern onto the first garment template to obtain a first finished garment.

The method further includes: indicating the first finished garment as a first garment product, identifiable by a first product code identifier; inputting the first laser file to the laser finishing machine to burn the first finishing pattern onto the second garment template to obtain a second finished garment; and indicating the second finished garment as a second garment product, identifiable by a second product code identifier, different form the first product code identifier.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIGS. 10-11 show examples of mobile devices.

FIG. 12 shows a system block diagram of a mobile device.

DETAILED DESCRIPTION OF THE INVENTION

Figure 1:
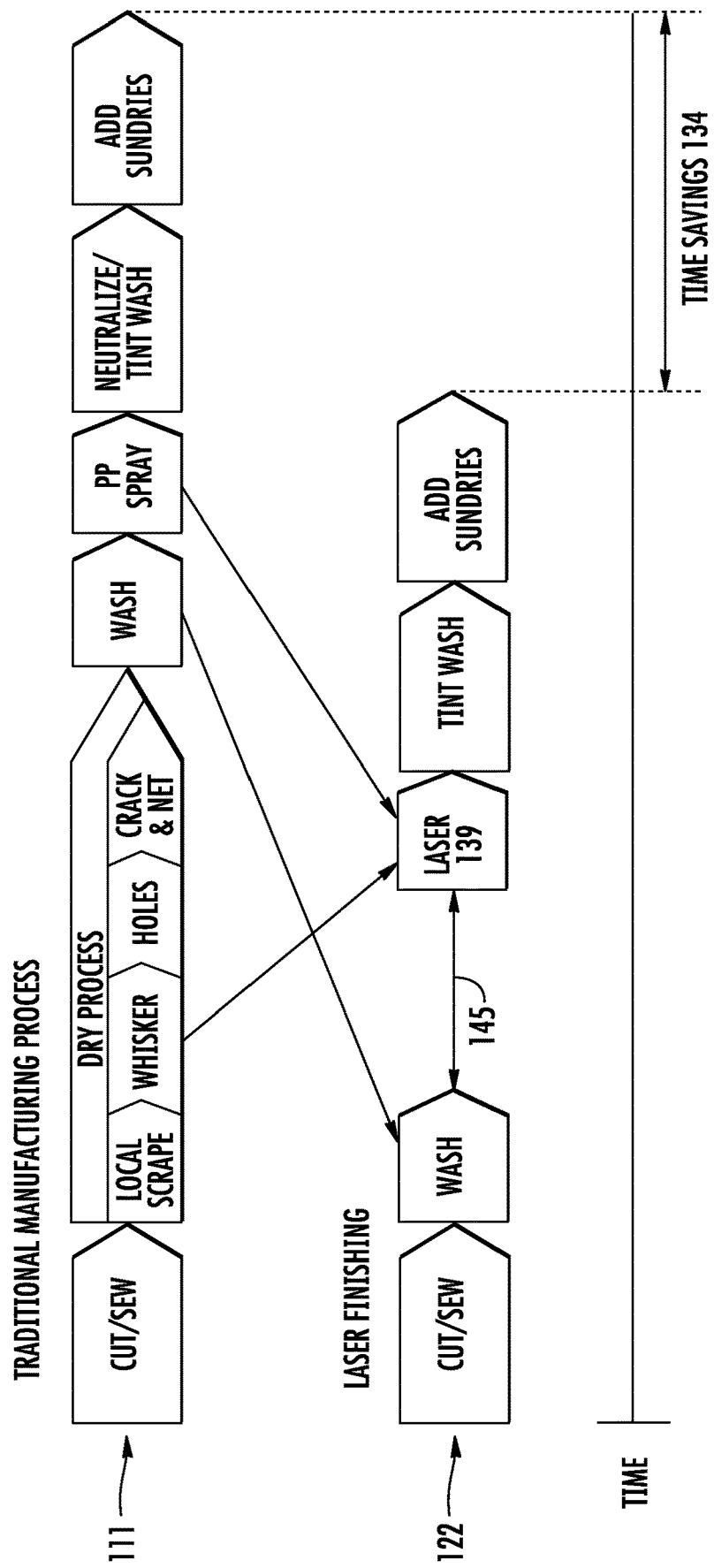
FIG. 1 shows a comparison between traditional manufacturing and laser finishing.

FIG. 1 shows a comparison between a traditional manufacturing process 111 and laser finishing 122 to produce distressed apparel including jeans. Compared to the traditional flow, the laser finishing process provides significant time savings 134.

The traditional process includes dry processing such as local scrape, whisker, holes, and crack and net to produce apparel with a distressed distress appearance. Crack and net is an example of a manual technique where jeans are placed in a sausage casing like net and washed while in the net to gain white streaks on the surface of the finish, which replicate a feature of vintage jeans. There also a potassium permanganate (PP) spray which is a chemical oxidizer.

In the laser finishing flow, the traditional dry process and chemical steps are replaced by a laser finishing step 139. The overall process flow for laser finishing is simpler, takes less time, and is more environmentally and resource friendly (e.g., chemical oxidizers are not used). There is a time gap 145 between a wash step and laser finishing 139. This gap represents a postponement time from when base wash is done to when the finish is finally designated. The apparel manufacturer has more time before committing to a particular finish, so that with the laser finishing, the manufacturer can adapt and respond to market trends more quickly.

Some steps occur in both flows, such as cut and sew, wash, tint wash, and add sundries. These steps take a similar amount of time in both flows. The add sundries step refers to adding tags and the like to the jeans. Since oxidizers are not used in laser finishing, the tint wash is for tinting, not neutralizing and tinting as in the traditional flow.

Figure 2:
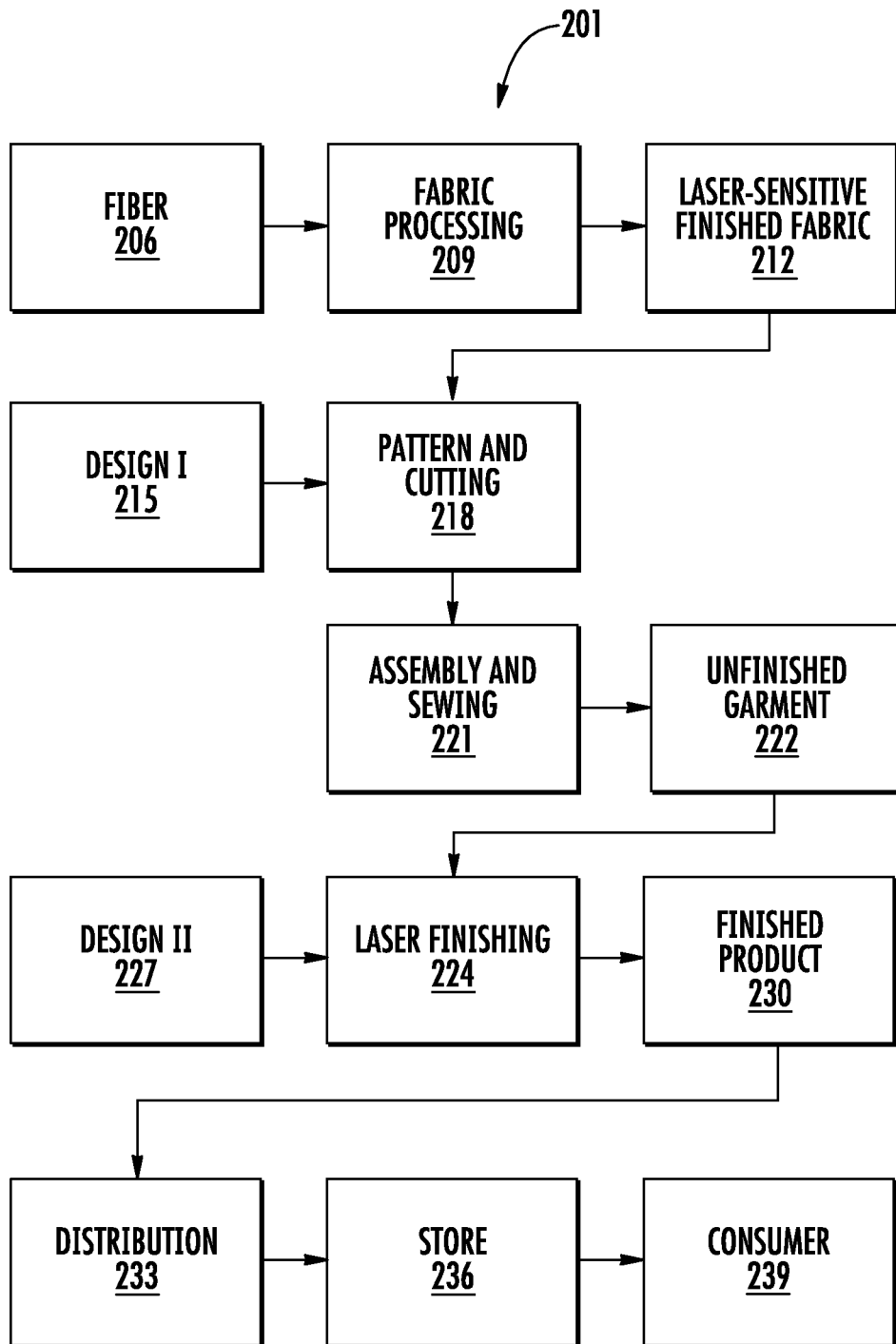
FIG. 2 shows a process flow for manufacturing apparel such as jeans, where garments are finished using a laser.

FIG. 2 shows a process flow 201 for manufacturing apparel such as jeans, where garments are finished using a laser. The fabric or material for various apparel including jeans is made from natural or synthetic fibers 206, or a combination of these. A fabric mill takes fibers and processes 209 these fibers to produce a laser-sensitive finished fabric 212, which has enhanced response characteristics for laser finishing.

Some examples of natural fibers include cotton, flax, hemp, sisal, jute, kenaf, and coconut; fibers from animal sources include silk, wool, cashmere, and mohair. Some examples of synthetic fibers include polyester, nylon, spandex or elastane, and other polymers. Some examples of semisynthetic fibers include rayon, viscose, modal, and lyocell, which are made from a regenerated cellulose fiber. A fabric can be a natural fiber alone (e.g., cotton), a synthetic fiber alone (e.g., polyester alone), a blend of natural and synthetic fibers (e.g., cotton and polyester blend, or cotton and spandax), or a blend of natural and semisynthetic fibers, or any combination of these or other fibers.

For jeans, the fabric is typically a denim, which is a sturdy cotton warp-faced textile in which a weft passes under two or more warp threads. This twill weaving produces a diagonal ribbing. The fabric is dyed using an indigo or blue dye, which is characteristic of blue jeans.

Although this patent describes the apparel processing and finishing with respect to jeans, the invention is not limited jeans or denim products, such as shirts, shorts, jackets, vests, and skirts. The techniques and approaches described are applicable to other apparel and products, including non-denim products and products made from knit materials. Some examples include T-shirts, sweaters, coats, sweatshirts (e.g., hoodies), casual wear, athletic wear, outerwear, dresses, evening wear, sleepwear, loungewear, underwear, socks, bags, backpacks, uniforms, umbrellas, swimwear, bed sheets, scarves, and many others.

A manufacturer creates a design 215 (design I) of its product. The design can be for a particular type of clothing or garment (e.g., men's or women's jean, or jacket), sizing of the garment (e.g., small, medium, or large, or waist size and inseam length), or other design feature. The design can be specified by a pattern or cut used to form pieces of the pattern. A fabric is selected and patterned and cut 218 based on the design. The pattern pieces are assembled together 221 into the garment, typically by sewing, but can be joined together using other techniques (e.g., rivets, buttons, zipper, hoop and loop, adhesives, or other techniques and structures to join fabrics and materials together).

Some garments can be complete after assembly and ready for sale. However, other garments are unfinished 222 and have additional finishing 224 (which can include laser finishing). The finishing may include tinting, washing, softening, and fixing. For distressed denim products, the finishing can include using a laser to produce a wear pattern according to a design 227 (design II). Some additional details of laser finishing are described in U.S. patent application 62/377,447, filed Aug. 19, 2016, which is incorporated by reference. U.S. patent application Ser. Nos. 15/841,263, 15/841,267, 15/841,271, and 15/841,272, filed Dec. 13, 2017; Ser. No. 15/682,507, filed Aug. 21, 2017; and 62/433,746, filed Dec. 13, 2016, are also incorporated by reference.

Design 227 is for postassembly aspects of a garment while design 215 is for preassembly aspects of a garment. After finishing, a finished product 230 is complete and ready for sale. The finished product is inventoried and distributed 233, delivered to stores 236, and sold to consumers or customers 239. The consumer can buy and wear worn blue jeans without having to wear out the jeans themselves, which usually takes significant time and effort.

Traditionally, to produce distressed denim products, finishing techniques include dry abrasion, wet processing, oxidation, or other techniques, or combinations of these, to accelerate wear of the material in order to produce a desired wear pattern. Dry abrasion can include sandblasting or using sandpaper. For example, some portions or localized areas of the fabric are sanded to abrade the fabric surface. Wet processing can include washing in water, washing with oxidizers (e.g., bleach, peroxide, ozone, or potassium permanganate), spraying with oxidizers, washing with abrasives (e.g., pumice, stone, or grit).

These traditional finishing approaches take time, incur expense, and impact the environment by utilizing resources and producing waste. It is desirable to reduce water and chemical usage, which can include eliminating the use agents such as potassium permanganate and pumice. An alternative to these traditional finishing approaches is laser finishing. Laser finishing can replace many steps in the traditional finishing approach, leading to cost and time savings.

Figure 3:
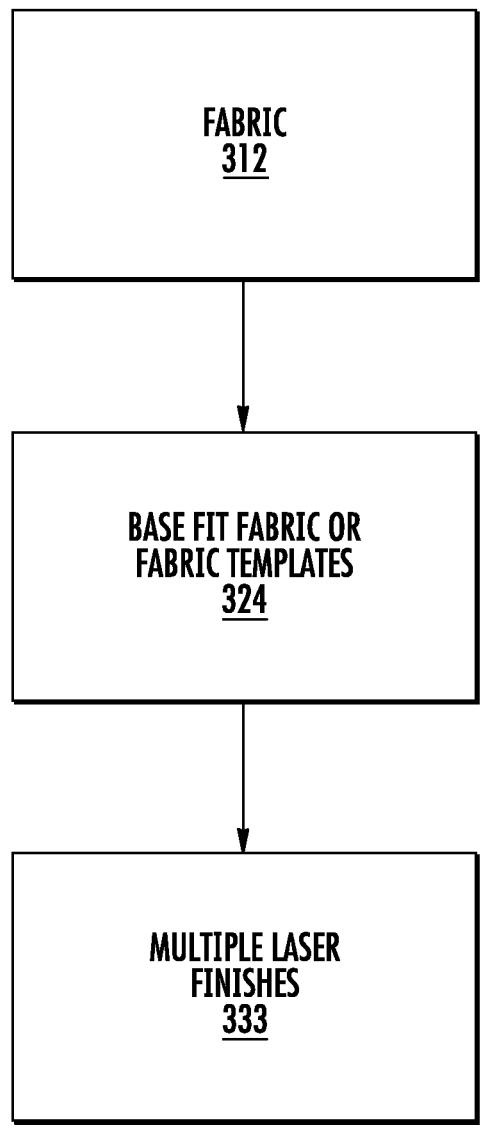
FIG. 3 shows a technique of creating multiple finishes by laser finishing a fabric template (or a base fit fabric) for a fabric.

FIG. 3 shows a technique of creating multiple finishes by laser finishing a base fit fabric for a fabric. Laser finishing can be used to create many different finishes (each a different product) easily and quickly from the same fabric template or "blank." These fabric templates can be referred to as base fit fabrics or BFFs.

In short, base fit fabrics are assembled garments in fabrics (e.g., warp stretch, selvedge, and others) for various fits (e.g., 502, 511, or 711, and others) that have been base washed (e.g., light, medium, dark, and others). The base fit fabrics serve as templates for laser finishing.

For each fabric 312, there will be a number of base fit fabrics 324. These base fit fabrics are lasered to produce many different finishes 333, each being a different product for product line. Laser finishing allows greater efficiency because by using fabric templates (or base fit fabrics), a single fabric or material can be used to create many different products for a product line, more than is possible with traditional processing. This reduces the inventory of different fabric and finish raw materials.

Figures 4, 5:
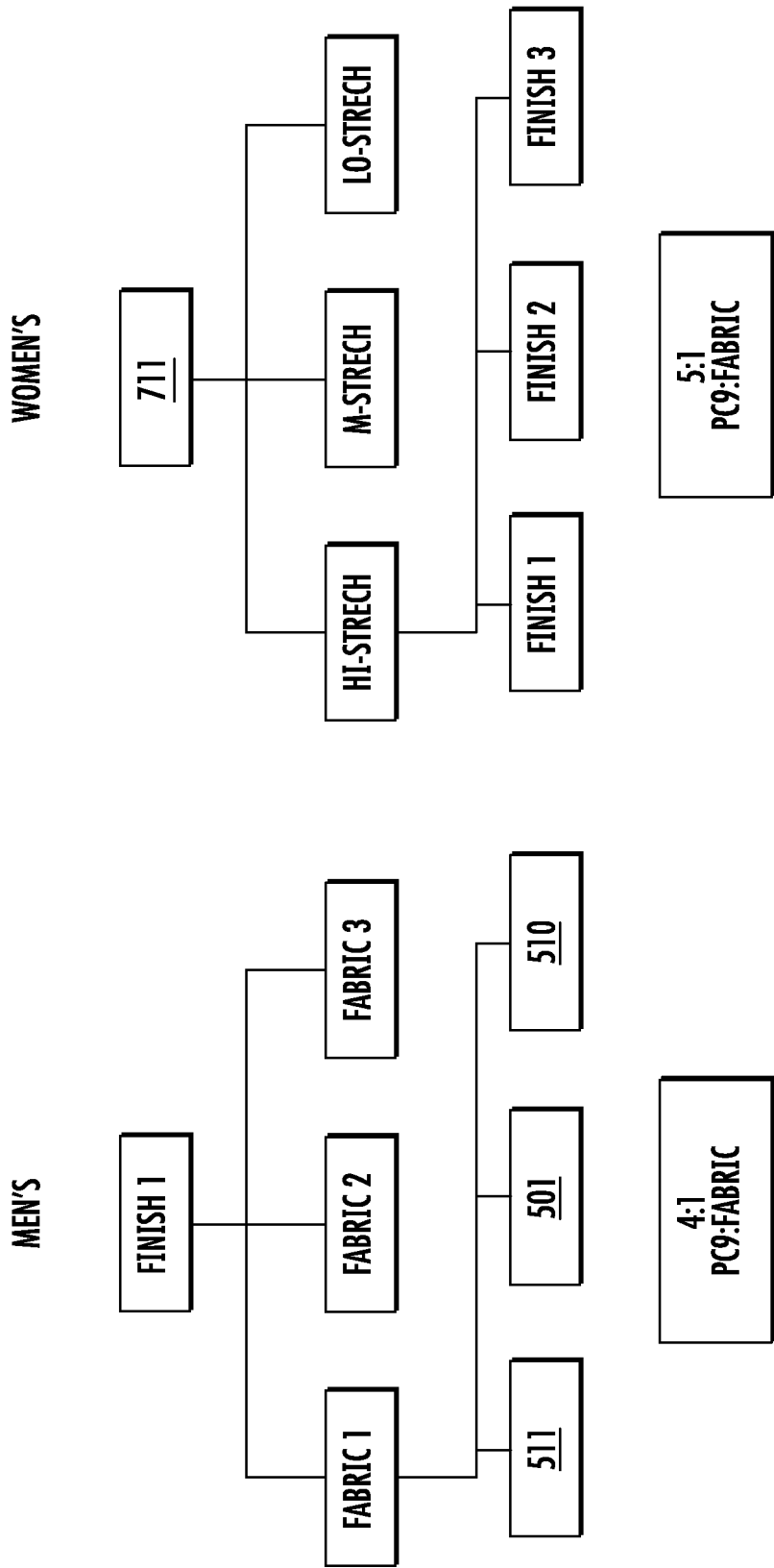
FIG. 4 shows an example of use of finishes and fabrics to create different products for men's jeans with traditional processing.
FIG. 5 shows an example of use of finishes and fabrics to create different products for women's jeans with traditional processing.

FIG. 4 shows an example of use of finishes and fabrics to create different products for men's jeans with traditional processing. A particular finish (finish 1) is done with three different fabrics (fabric 1, fabric 2, and fabric 3). Fabric 1 is used to product three different products, the 511, 501, and 510 products.

As an example, with traditional processing, for men's jeans, an average of about four products are produced for each fabric. PC9 refers to a product code (e.g., a nine digit product code), each product code describing a different product model. For example, there can be the 511 jeans line in different sizes with one distressing pattern; this would be categorized under a first PC9 code. And there can be the 501 jeans line in different sizes with one distressing pattern; this would be categorized as a second PC9 code, different from the first PC9. Therefore, each PC9 code refers to a different product or product model.

FIG. 5 shows an example of use of finishes and fabrics to create different products for women's jeans with traditional processing. For a 711 product, there can be three different fabrics with different degrees of stretch, high stretch, medium stretch, and low stretch. As an example, with traditional processing, for women's jeans, an average of about five products or PC9s are produced for each fabric.

Figure 6:
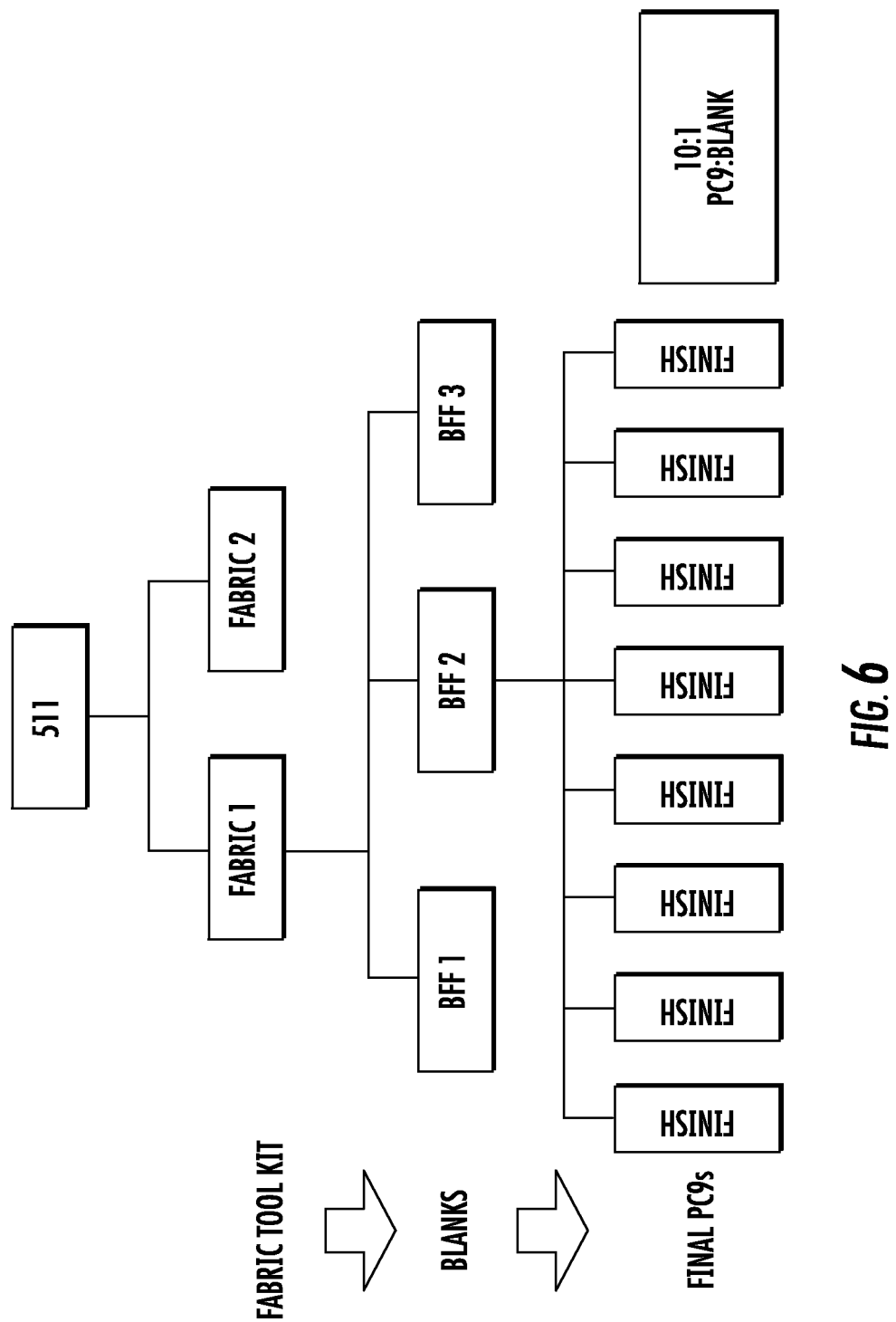
FIG. 6 shows a hierarchy of fabrics and finishes for laser processing, where the hierarchy includes fabric templates (or base fit fabrics).

FIG. 6 shows a hierarchy of fabrics and finishes for laser processing. For the 511 product, there can be two different fabrics, fabric 1 and fabric 2. The fabrics can be part of a fabric tool kit. For fabric 1, there are three base fit fabrics, BFF1, BFF2, and BFF3. Using laser finishing, a base fit fabrics can be used to product eight different finishes, each of which would be considered a different product model. Although only eight different finishes are shown, then can be any number of finishes (e.g., 8 or more, 20 or more, or 100 or more).

Thus, with laser finishing, in a comparison to FIGS. 4 and 5, ten products or PC9s are produced for each base fit fabric or blank. Compared to traditional processing, this is a significant improvement in providing greater numbers of different products with less different fabrics and finishes (each of which in traditional processing consume resources, increasing cost, and take time). Inventory is reduced. The technique of providing base fit finishes or fabric templates for laser finishing has significant and many benefits.

Figure 7:
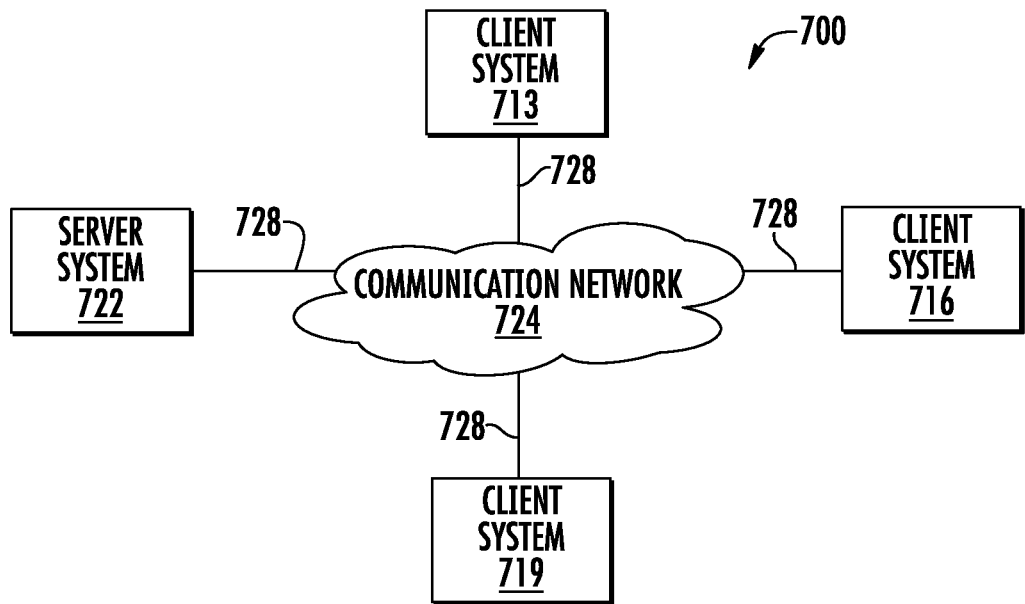
FIG. 7 is shows a distributed computer network.

A system incorporating laser finishing can include a computer to control or monitor operation, or both. FIG. 7 shows an example of a computer that is component of a laser finishing system. The computer may be a separate unit that is connected to a system, or may be embedded in electronics of the system. In an embodiment, the invention includes software that executes on a computer workstation system or server, such as shown in FIG. 7.

FIG. 7 is a simplified block diagram of a distributed computer network 700 incorporating an embodiment of the present invention. Computer network 700 includes a number of client systems 713, 716, and 719, and a server system 722 coupled to a communication network 724 via a plurality of communication links 728. Communication network 724 provides a mechanism for allowing the various components of distributed network 700 to communicate and exchange information with each other.

Communication network 724 may itself be comprised of many interconnected computer systems and communication links. Communication links 728 may be hardwire links, optical links, satellite or other wireless communications links, wave propagation links, or any other mechanisms for communication of information. Communication links 728 may be DSL, Cable, Ethernet or other hardwire links, passive or active optical links, 3G, 3.5G, 4G and other mobility, satellite or other wireless communications links, wave propagation links, or any other mechanisms for communication of information.

Various communication protocols may be used to facilitate communication between the various systems shown in FIG. 7. These communication protocols may include VLAN, MPLS, TCP/IP, Tunneling, HTTP protocols, wireless application protocol (WAP), vendor-specific protocols, customized protocols, and others. While in one embodiment, communication network 724 is the Internet, in other embodiments, communication network 724 may be any suitable communication network including a local area network (LAN), a wide area network (WAN), a wireless network, an intranet, a private network, a public network, a switched network, and combinations of these, and the like.

Distributed computer network 700 in FIG. 7 is merely illustrative of an embodiment incorporating the present invention and does not limit the scope of the invention as recited in the claims. One of ordinary skill in the art would recognize other variations, modifications, and alternatives. For example, more than one server system 722 may be connected to communication network 724. As another example, a number of client systems 713, 716, and 719 may be coupled to communication network 724 via an access provider (not shown) or via some other server system.

Client systems 713, 716, and 719 typically request information from a server system which provides the information. For this reason, server systems typically have more computing and storage capacity than client systems. However, a particular computer system may act as both as a client or a server depending on whether the computer system is requesting or providing information. Additionally, although aspects of the invention have been described using a client-server environment, it should be apparent that the invention may also be embodied in a standalone computer system.

Server 722 is responsible for receiving information requests from client systems 713, 716, and 719, performing processing required to satisfy the requests, and for forwarding the results corresponding to the requests back to the requesting client system. The processing required to satisfy the request may be performed by server system 722 or may alternatively be delegated to other servers connected to communication network 724.

Client systems 713, 716, and 719 enable users to access and query information stored by server system 722. In a specific embodiment, the client systems can run as a stand-alone application such as a desktop application or mobile smartphone or tablet application. In another embodiment, a "web browser" application executing on a client system enables users to select, access, retrieve, or query information stored by server system 722. Examples of web browsers include the Internet Explorer browser program provided by Microsoft Corporation, Firefox browser provided by Mozilla, Chrome browser provided by Google, Safari browser provided by Apple, and others.

In a client-server environment, some resources (e.g., files, music, video, or data) are stored at the client while others are stored or delivered from elsewhere in the network, such as a server, and accessible via the network (e.g., the Internet). Therefore, the user's data can be stored in the network or "cloud." For example, the user can work on documents on a client device that are stored remotely on the cloud (e.g., server). Data on the client device can be synchronized with the cloud.

Figure 8:
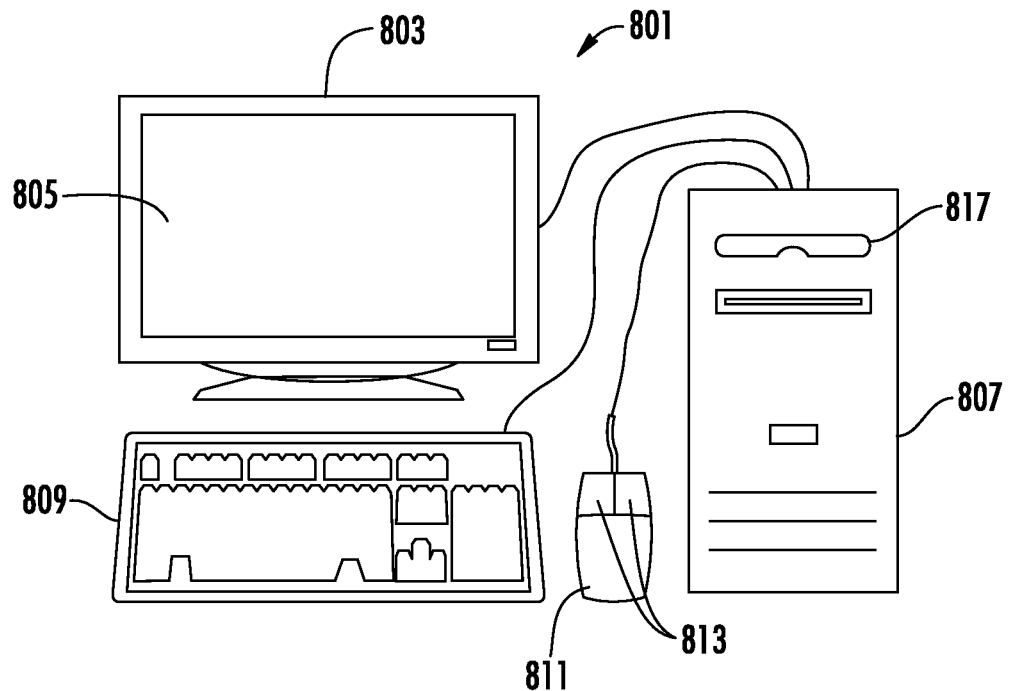
FIG. 8 shows a computer system that can be used in laser finishing.

FIG. 8 shows an exemplary client or server system of the present invention. In an embodiment, a user interfaces with the system through a computer workstation system, such as shown in FIG. 8. FIG. 8 shows a computer system 801 that includes a monitor 803, screen 805, enclosure 807 (may also be referred to as a system unit, cabinet, or case), keyboard or other human input device 809, and mouse or other pointing device 811. Mouse 811 may have one or more buttons such as mouse buttons 813.

It should be understood that the present invention is not limited any computing device in a specific form factor (e.g., desktop computer form factor), but can include all types of computing devices in various form factors. A user can interface with any computing device, including smartphones, personal computers, laptops, electronic tablet devices, global positioning system (GPS) receivers, portable media players, personal digital assistants (PDAs), other network access devices, and other processing devices capable of receiving or transmitting data.

For example, in a specific implementation, the client device can be a smartphone or tablet device, such as the Apple iPhone (e.g., Apple iPhone 6), Apple iPad (e.g., Apple iPad or Apple iPad mini), Apple iPod (e.g, Apple iPod Touch), Samsung Galaxy product (e.g., Galaxy S series product or Galaxy Note series product), Google Nexus devices (e.g., Google Nexus 6, Google Nexus 7, or Google Nexus 9), and Microsoft devices (e.g., Microsoft Surface tablet). Typically, a smartphone includes a telephony portion (and associated radios) and a computer portion, which are accessible via a touch screen display.

There is nonvolatile memory to store data of the telephone portion (e.g., contacts and phone numbers) and the computer portion (e.g., application programs including a browser, pictures, games, videos, and music). The smartphone typically includes a camera (e.g., front facing camera or rear camera, or both) for taking pictures and video. For example, a smartphone or tablet can be used to take live video that can be streamed to one or more other devices.

Enclosure 807 houses familiar computer components, some of which are not shown, such as a processor, memory, mass storage devices 817, and the like. Mass storage devices 817 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive or solid state drive (SSD)), battery-backed-up volatile memory, tape storage, reader, and other similar media, and combinations of these.

A computer-implemented or computer-executable version or computer program product of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 817. The source code of the software of the present invention may also be stored or reside on mass storage device 817 (e.g., hard disk, magnetic disk, tape, or CD-ROM). As a further example, code of the invention may be transmitted via wires, radio waves, or through a network such as the Internet.

Figure 9:
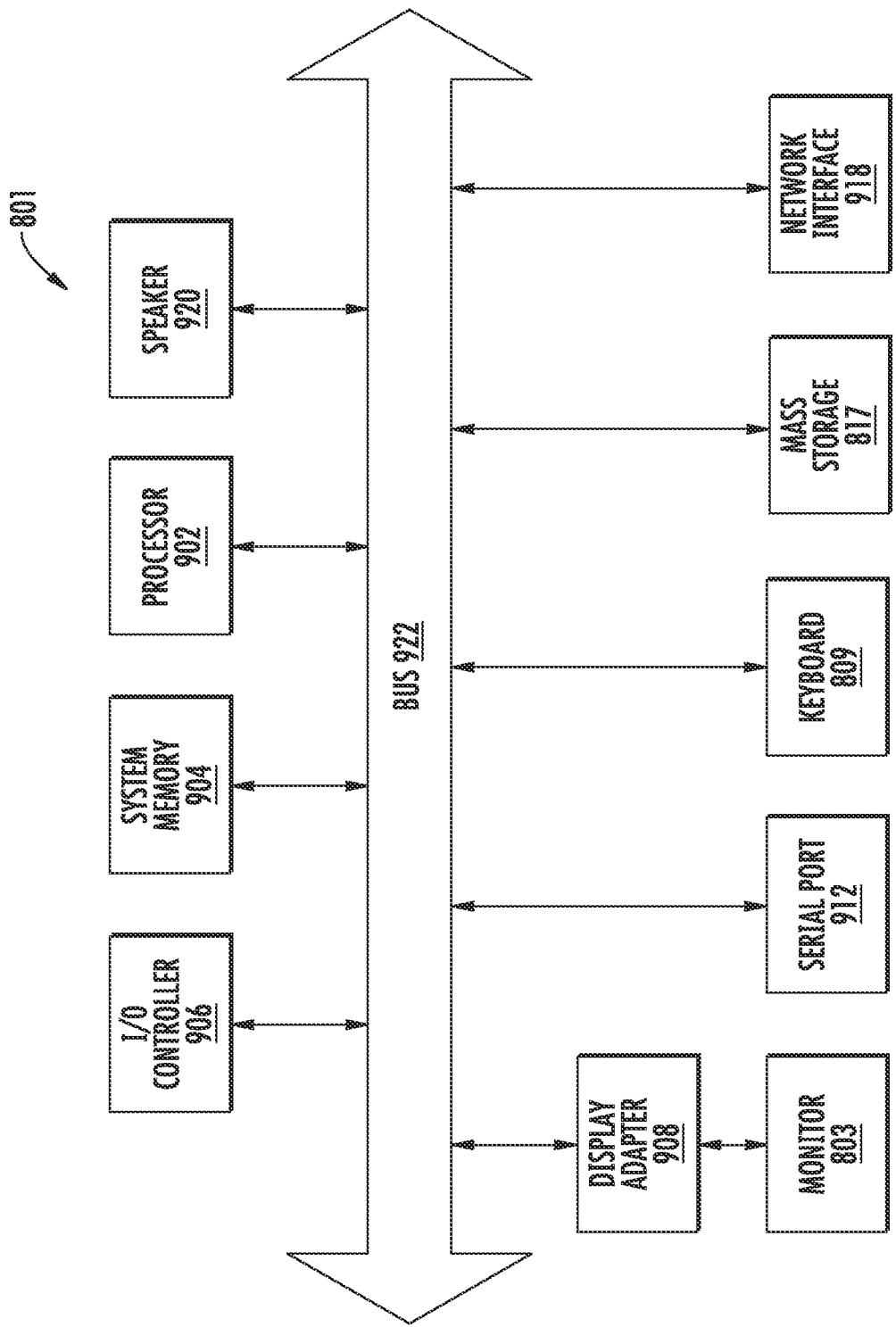
FIG. 9 shows a system block diagram of the computer system.

FIG. 9 shows a system block diagram of computer system 801 used to execute the software of the present invention. As in FIG. 8, computer system 801 includes monitor 803, keyboard 809, and mass storage devices 817. Computer system 501 further includes subsystems such as central processor 902, system memory 904, input/output (I/O) controller 906, display adapter 908, serial or universal serial bus (USB) port 912, network interface 918, and speaker 920. The invention may also be used with computer systems with additional or fewer subsystems. For example, a computer system could include more than one processor 902 (i.e., a multiprocessor system) or a system may include a cache memory.

Arrows such as 922 represent the system bus architecture of computer system 801. However, these arrows are illustrative of any interconnection scheme serving to link the subsystems. For example, speaker 920 could be connected to the other subsystems through a port or have an internal direct connection to central processor 902. The processor may include multiple processors or a multicore processor, which may permit parallel processing of information. Computer system 801 shown in FIG. 8 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, www-.mathworks.com), SAS, SPSS, JavaScript, AJAX, Java, Python, Erlang, and Ruby on Rails. The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation).

An operating system for the system may be one of the Microsoft Windows® family of systems (e.g., Windows 95, 98, Me, Windows NT, Windows 2000, Windows XP, Windows XP x64 Edition, Windows Vista, Windows 7, Windows 8, Windows 10, Windows CE, Windows Mobile, Windows RT), Symbian OS, Tizen, Linux, HP-UX, UNIX, Sun OS, Solaris, Mac OS X, Apple iOS, Android, Alpha OS, AIX, IRIX32, or IRIX64. Other operating systems may be used. Microsoft Windows is a trademark of Microsoft Corporation.

Any trademarks or service marks used in this patent are property of their respective owner. Any company, product, or service names in this patent are for identification purposes only. Use of these names, logos, and brands does not imply endorsement.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless (e.g., 2G, 3G, 4G, 3GPP LTE, WiMAX, LTE, LTE Advanced, Flash-OFDM, HIPERMAN, iBurst, EDGE Evolution, UMTS, UMTS-TDD, 1xRDD, and EV-DO). For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications (which are sometimes also referred to as "apps") can be updated (e.g., periodically) via a direct internet upgrade patching mechanism or through an applications store (e.g., Apple iTunes and App store, Google Play store, Windows Phone store, and Blackberry App World store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

FIGS. 10-11 show examples of mobile devices, which can be mobile clients. Mobile devices are specific implementations of a computer, such as described above. FIG. 10 shows a smartphone device 1001, and FIG. 11 shows a tablet device 1101. Some examples of smartphones include the Apple iPhone, Samsung Galaxy, and Google Nexus family of devices. Some examples of tablet devices include the Apple iPad, Samsung Galaxy Tab, and Google Nexus family of devices.

Smartphone 1001 has an enclosure that includes a screen 1003, button 1009, speaker 1011, camera 1013, and proximity sensor 1035. The screen can be a touch screen that detects and accepts input from finger touch or a stylus. The technology of the touch screen can be a resistive, capacitive, infrared grid, optical imaging, or pressure-sensitive, dispersive signal, acoustic pulse recognition, or others. The touch screen is screen and a user input device interface that acts as a mouse and keyboard of a computer.

Button 1009 is sometimes referred to as a home button and is used to exit a program and return the user to the home screen. The phone may also include other buttons (not shown) such as volume buttons and on-off button on a side. The proximity detector can detect a user's face is close to the phone, and can disable the phone screen and its touch sensor, so that there will be no false inputs from the user's face being next to screen when talking.

Tablet 1101 is similar to a smartphone. Tablet 1101 has an enclosure that includes a screen 1103, button 1109, and camera 1113. Typically the screen (e.g., touch screen) of a tablet is larger than a smartphone, usually 7, 8, 9, 10, 12, 13, or more inches (measured diagonally).

FIG. 12 shows a system block diagram of mobile device 1201 used to execute the software of the present invention. This block diagram is representative of the components of smartphone or tablet device. The mobile device system includes a screen 1203 (e.g., touch screen), buttons 1209, speaker 1211, camera 1213, motion sensor 1215, light sensor 1217, microphone 1219, indicator light 1221, and external port 1223 (e.g., USB port or Apple Lightning port). These components can communicate with each other via a bus 1225.

The system includes wireless components such as a mobile network connection 1227 (e.g., mobile telephone or mobile data), Wi-Fi 1229, Bluetooth 1231, GPS 1233 (e.g., detect GPS positioning), other sensors 1235 such as a proximity sensor, CPU 1237, RAM memory 1239, storage 1241 (e.g. nonvolatile memory), and battery 1243 (lithium ion or lithium polymer cell). The battery supplies power to the electronic components and is rechargeable, which allows the system to be mobile.

Figure 13:
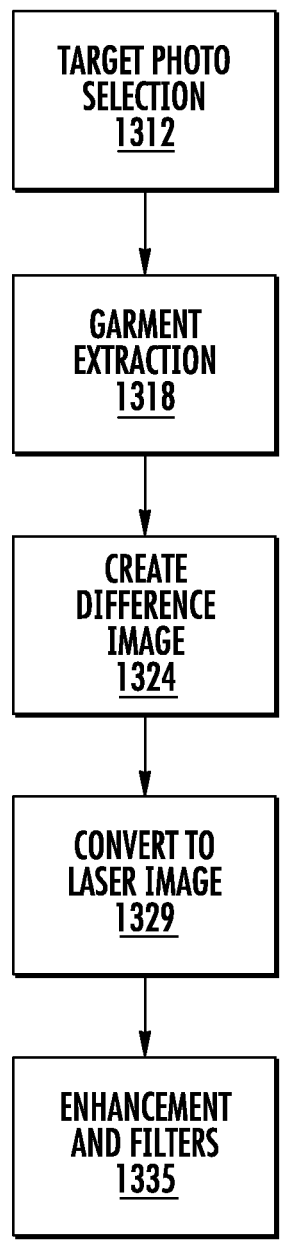
FIG. 13 shows flow for finishing apparel to produce a desired wear pattern.

FIG. 13 shows flow for finishing apparel to produce a desired wear pattern. A technique includes determining a fabric's response to a laser, capturing an initial image of a wear pattern on a garment, and processing the initial image to obtain a working image in grayscale. The working image is further processed to obtain a difference image by comparing each pixel relative to a dark reference. The difference image is converted to a laser values image by using the previously determined fabric response to the laser.

In a step 1312, a desired target photo is selected. An input is a user file selection. An output is an imported image.

In a step 1318, a garment is extracted from the photo. An input is an imported image. An output is a work image.

In a step 1324, a difference image is converted to a laser fabric file. An input is a different image. An output is a laser image.

In a step 1329, the difference image is converted to a laser fabric file. An input is a difference image. An output is a laser image.

In a step 1335, user defined filtering and feature enhancement is performed. An input is a laser image. An output is an enhanced image.

Figure 14:
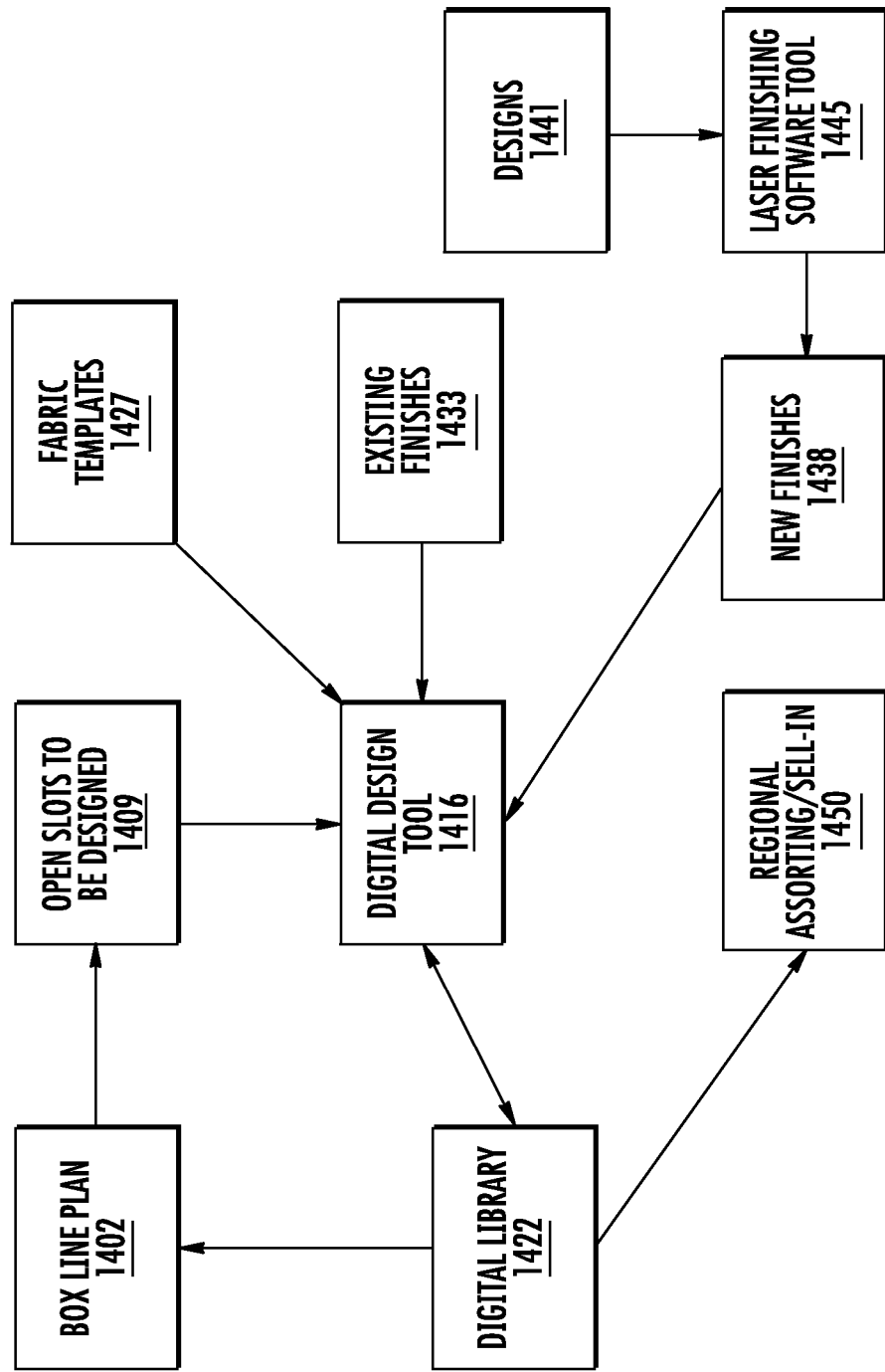
FIG. 14 shows a block diagram of a system for creating, designing, producing apparel products with laser finishing.

FIG. 14 shows a block diagram of a system for creating, designing, producing apparel products with laser finishing. A box line plan 1402 is an internal and interim tool for communication between a merchandising group and design group. Through the box line plan, merchandising can communicate what needs to be designed by the design group. The box line plan can have open slots to be designed 1409.

There is a digital design tool 1416 merchants and design can use to click and drag finish effects (e.g., laser files) and tint casts over images of base washes (BFFs) in order to visualize possible combinations and build the line visually before the garment finish is actually finished by the laser. The visualizations can be by rendering on a computer system, such as using three-dimensional (3D) graphics. A specific implementation of a digital design tool is described in U.S. patent application 62/579,863, filed Oct. 31, 2017, which is incorporated by reference.

Designers can use the digital design tool to design products that are used to satisfy the requests in open slots 1409. Designs created using the digital design tool can be stored in a digital library 1422. Input to the digital design tool include fabric templates or blanks 1427 (e.g., base fit fabrics or BFFs), existing finishes 1433 (e.g., can be further modified by the tool 1416), and new finishes 1438. New finishes can be from designs 1441 (e.g., vintage design) captured using a laser finish software tool 1445, examples of which are described in FIG. 13 and U.S. patent application 62/377,447, filed Aug. 19, 2016. Digital library 1422 can be accessible by the region assorting and sell-in 1450. And the digital library can be used populate or satisfy the box line plan.

Figure 15:
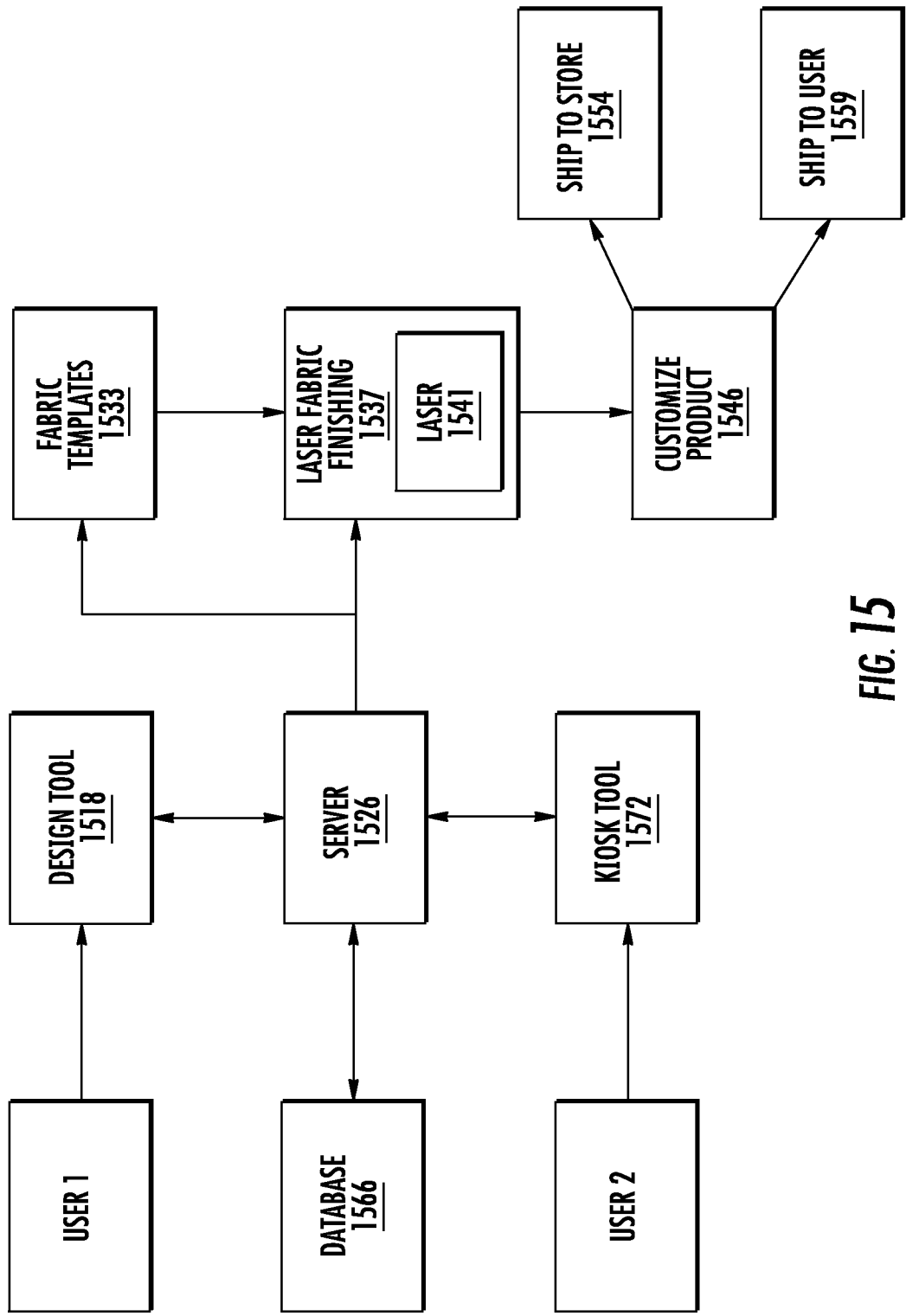
FIG. 15 shows a block diagram of a user tool to create customized apparel using laser finishing.

FIG. 15 shows a block diagram of a user or consumer tool to create customized apparel using laser finishing. A user (user 1) can access a design tool 1518. This design tools might be available and execute via a Web browser or a mobile application (e.g., smartphone or tablet app). The design tool interacts and communicates over a network with a server 1526. The design tool allows the user to create or customize a unique distressing or other pattern on, for example, jeans. The user will be able to visualize the design on a computer screen before making an order for the customized product.

The design tool communicates the user's design to the server. The server handles selecting an appropriate fabric template or blank 1533 and sending an appropriate laser file to the laser fabric finishing system 1537 to control the laser 1541 to make the customized product 1546. The customized product can be shipped to a store 1554 or shipped directly to the user 1559.

Further, the server has access to a database 1566, where the server can store a user's designed, so that the user may access the same design in the future. The database may also be a digital library of different designs that the user can select and add to make their customized design.

Instead of using a Web browser or mobile app, a user (user 2) can also access create a customize product through a kiosk tool 1572 that is at a store or other location. This can be helpful for customers who are already in the store or does not want to use the other tools. The kiosk tool is optional and is not included in some implementations of the system. In other implementations, there is a kiosk tool and not the design tool 1518.

Figure 16:
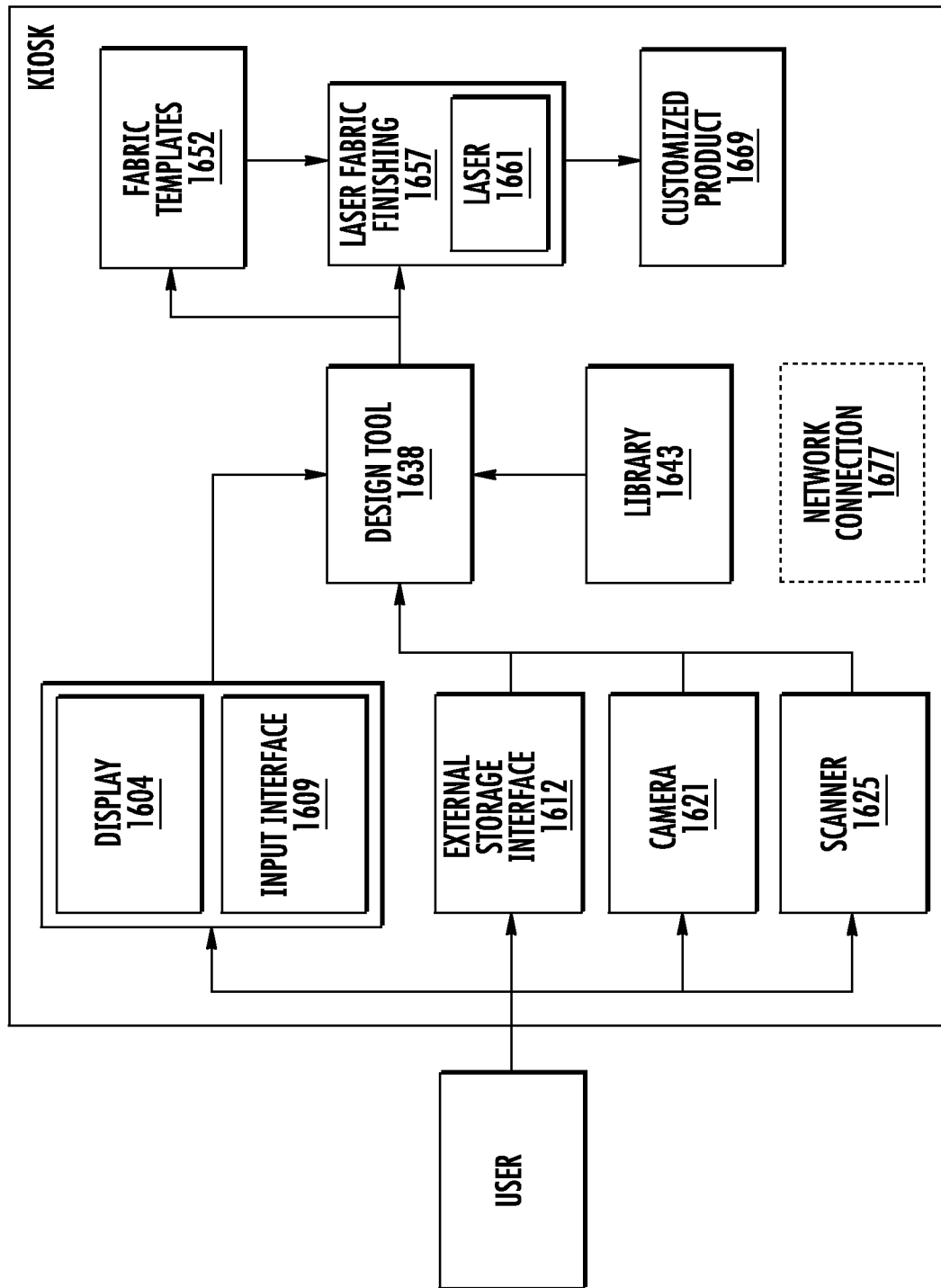
FIG. 16 shows an implementation of a kiosk tool.

FIG. 16 shows another implementation of a kiosk tool. The tool and components of the tool are in the same location (e.g., fabric blanks and laser), so the user will be able to design and received the customized product immediately, without waiting for shipping.

The kiosk has a display 1604 and input interface 1609 for the user to interact with the kiosk. The display can be a touchscreen, which incorporate the input interface. The user can also upload and save files via an external storage interface 1612, such as via a USB flash drive. Also, the kiosk can have a camera 1621 or scanner 1625, or both, to take as input images of existing patterns or designs.

A design tool 1638 takes input from any of the above input sources and additionally has access to a library 1643. With the design tool, the user can design a customized product. The tool handles selecting an appropriate fabric template or blank 1652, sending an appropriate laser file to the laser fabric finishing system 1657 to control the laser 1661 to make the customized product 1669. The customized product is available to the user minutes after lasering.

The kiosk can include an optional network connection 1677, which can be wired or wireless. With the network connection, the kiosk can connect over a network to other computers, servers, and machines. For example, software of the kiosk can be updated via the network. For example, through the network, the kiosk can check inventory of fabric templates, software of the kiosk can be updated, mobile devices can connect via Wi-Fi to the kiosk, and other functionality can be enabled.

Figure 17:
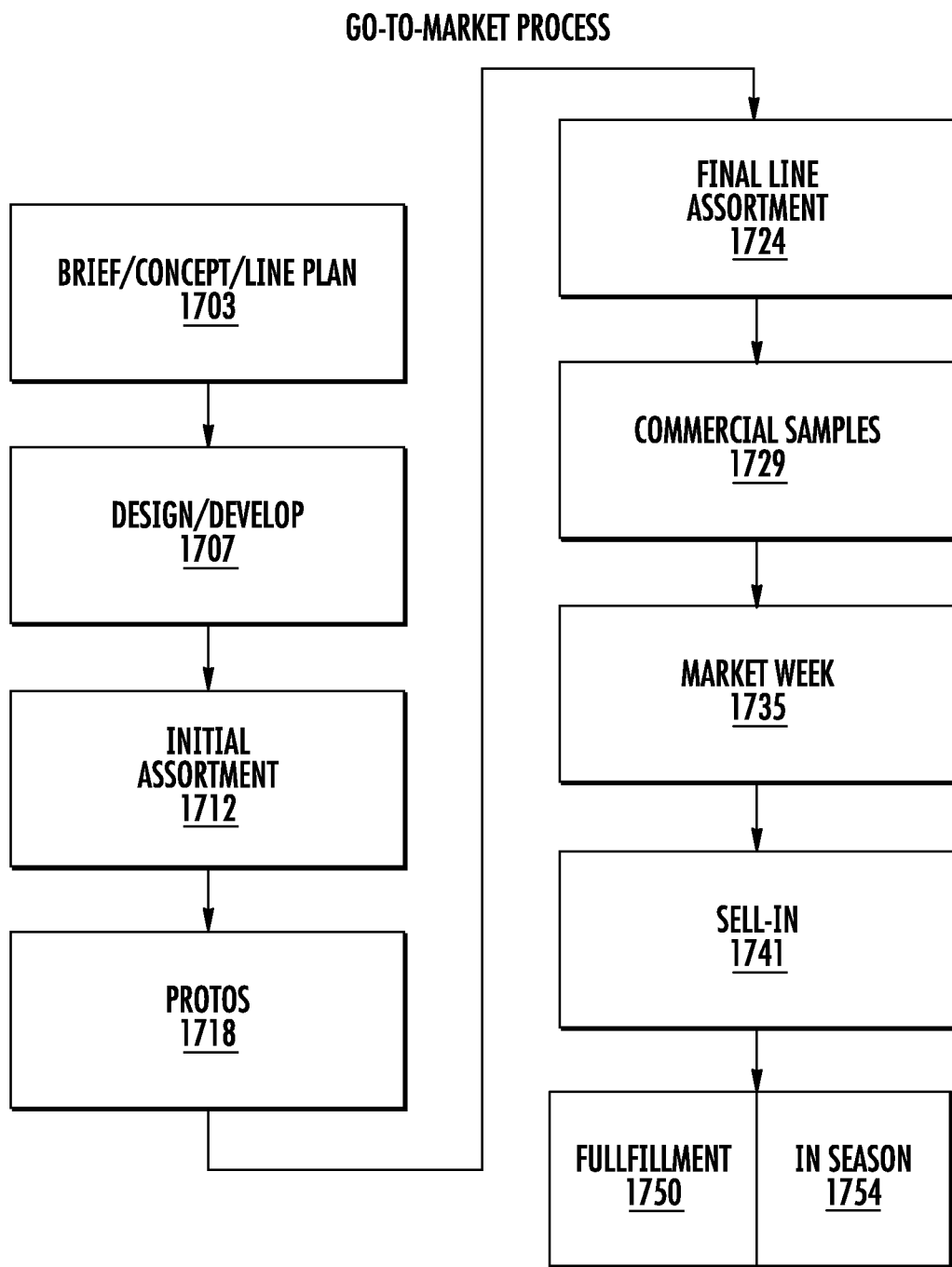
FIG. 17 shows traditional flow for getting an apparel product to market.

FIG. 17 shows traditional flow for getting a product to market. This also may be referred to as the "go-to-market" process. There are a brief, concept, or line plan phase 1703, design or development phase 1707, initial assortment 1712 (which may sometimes be referred to a line assortment worksheet (LAW)) or internal and interim checks in between merchandising and design to review product line phase 1712, prototype phase 1718, final line assortment (FLA) 1724 or a final line assortment meeting where the group aligns on what will be in the line phase, commercial samples phase 1729, market week time 1735, sell-in phase 1741, and fulfillment phase 1750 and in-season 1754.

Figure 18:
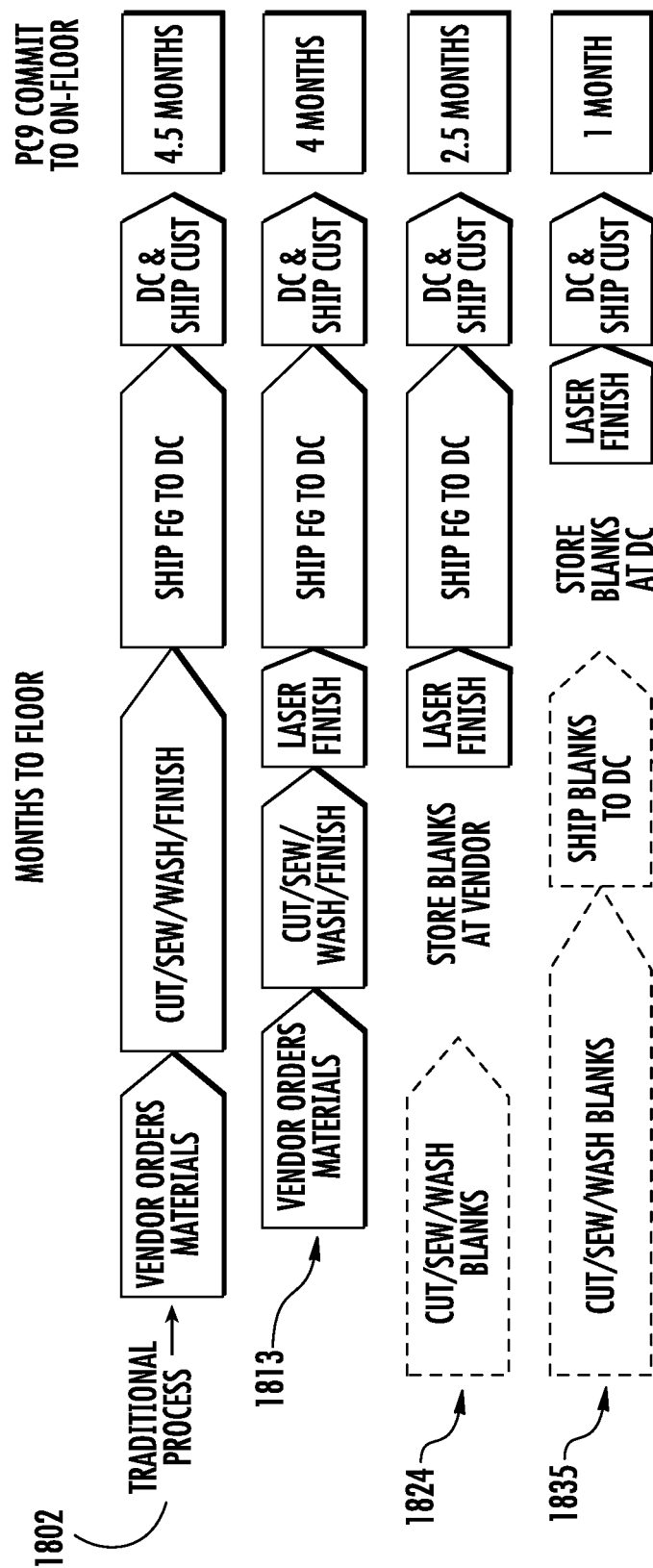
FIG. 18 shows various techniques for reducing time to market when using laser finishing

FIG. 18 shows various techniques for reducing time to market when using laser finishing. A flow 1802 is a process flow for traditional process. It will take, for example, about 4.5 months from product commitment to arriving on the floor for sale. FG refers to finished good. DC refers to distribution center.

A flow 1813 is a process flow for laser finishing, no other changes from the traditional process. This flow will take, for example, about 4 months from product commitment to arriving on the floor for sale.

A flow 1824 is another flow for laser finishing, where the blanks or fabric templates are stored at the vendor (e.g., fabric mill). This flow will take, for example, about 2.5 months from product commitment to arriving on the floor for sale. The time savings is due the fabric not needing to be shipped to the dry processing facility, which requires shipping time.

A flow 1835 is another flow for laser finishing, where the blanks or fabric templates are stored at the distribution center (e.g., close to the customer). This flow will take, for example, about 1 month from product commitment to arriving on the floor for sale. The time savings is due the fabric being laser finished, just be shipment, at a location close to the customer location.

In other flows, there can 1-day turnaround for in store or online orders or purchases. In such cases, blanks or base fit fabrics are stored at store or e-commerce distribution center. When the order is received, the blanks are burned immediately. Then the completed orders are delivered to customer. For online orders, overnight or other express shipping (e.g., 2-day shipping, 3-day shipping, messenger, plane, or drone) can be used.

Figure 19:
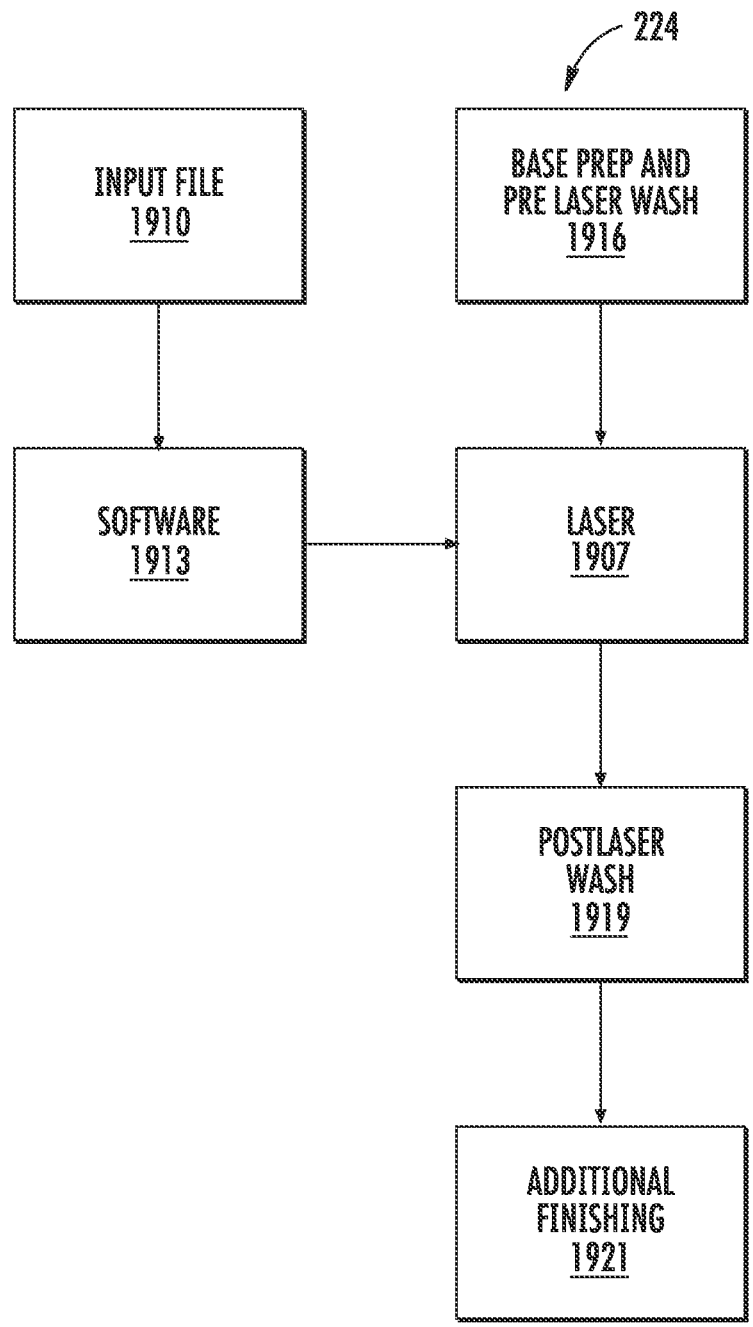
FIG. 19 shows a flow for a finishing technique that includes the use of a laser.

FIG. 19 shows a finishing technique that includes the use of a laser 1907. A laser is a device that emits light through a process of optical amplification based on the stimulated emission of electromagnetic radiation. Lasers are used for bar code scanning, medical procedures such as corrective eye surgery, and industrial applications such as welding. A particular type of laser for finishing apparel is a carbon dioxide laser, which emits a beam of infrared radiation.

The laser is controlled by an input file 1910 and control software 1913 to emit a laser beam onto fabric at a particular position or location at a specific power level for a specific amount of time. Further, the power of the laser beam can be varied according to a waveform such as a pulse wave with a particular frequency, period, pulse width, or other characteristic. Some aspects of the laser that can be controlled include the duty cycle, frequency, marking or burning speed, and other parameters.

The duty cycle is a percentage of laser emission time. Some examples of duty cycle percentages include 40, 45, 50, 55, 60, 80, and 100 percent. The frequency is the laser pulse frequency. A low frequency might be, for example, 5 kilohertz, while a high frequency might be, for example, 25 kilohertz. Generally, lower frequencies will have higher surface penetration than high frequencies, which has less surface penetration.

The laser acts like a printer and "prints," "marks," or "burns" a wear pattern (specified by input file 1910) onto the garment. The fabric that is exposed to the laser beam (e.g., infrared beam) changes color, lightening the fabric at a specified position by a certain amount based on the laser power, time of exposure, and waveform used. The laser continues from position to position until the wear pattern is completely printed on the garment.

In a specific implementation, the laser has a resolution of about 34 dots per inch (dpi), which on the garment is about 0.7 millimeters per pixel. The technique described in this patent is not dependent on the laser's resolution, and will work with lasers have more or less resolution than 34 dots per inch. For example, the laser can have a resolution of 10, 15, 20, 25, 30, 40, 50, 60, 72, 80, 96, 100, 120, 150, 200, 300, or 600 dots per inch, or more or less than any of these or other values. Typically, the greater the resolution, the finer the features that can be printed on the garment in a single pass. By using multiple passes (e.g., 2, 3, 4, 5, or more passes) with the laser, the effective resolution can be increased. In an implementation, multiple laser passes are used.

U.S. patent application 62/433,739, which is incorporated by reference, describes a denim material with enhanced response characteristics to laser finishing. Using a denim material made from indigo ring-dyed yarn, variations in highs and lows in indigo color shading is achieved by using a laser.

As shown in FIG. 19, before laser 1907, the fabric can be prepared 1916 for the laser, which may be referred to as a base preparation, and can include a prelaser wash. This wash is also referred to as a base wash (e.g., washed using a base wash recipe). This step helps improves the results of the laser. After the laser, there can be a postlaser wash 1919. This wash can clean or remove any residue caused by the laser, such as removing any charring (which would appear as brown or slightly burning). There can be additional finish 1221, which may be including tinting, softening, or fixing, to complete finishing.

Figure 20:
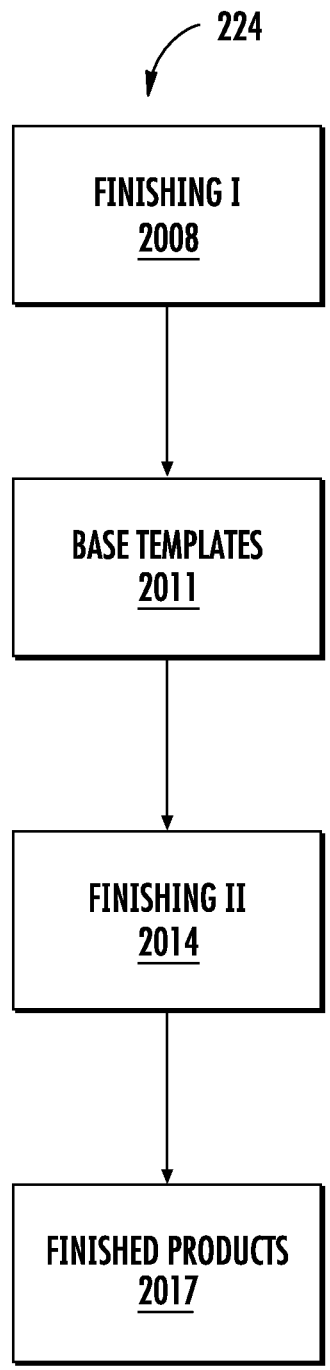
FIG. 20 shows a flow for finishing in two finishing steps and using base templates.

FIG. 20 shows a technique where finishing is divided into two finishing steps, finishing I and finishing II. Finishing I 2008 is an initial finishing to create base templates 2011. For example, fully assembled garments (e.g., jeans) can be base washed using a specific base wash recipe to obtain a base template.

Different base wash recipes are used to obtain different base templates. For example, the different base washes can vary in the amount of cycles, timing, temperature, abrasives, oxidizers, dyes, or tinting used, or any combination of these. The base template may be a dark finish, medium finish, light finish, ultralight finish, or other base finish. The dark finish can have a darker shade of indigo compared to the medium finish. The medium finish can have a darker shade of indigo compared to the light finish. The light finish can have a lighter shade of indigo compared to the medium and the dark finishes. The ultralight finish can have a lighter shade of indigo compared to the light shade finish.

With finishing II 2014 (e.g., laser finishing), each base template can be used to manufacture multiple final finishes 2017. For example, the laser uses a laser input file to burn a particular finishing pattern (e.g., wear pattern, whiskers, holes, or other) onto the garment.

Figure 21:
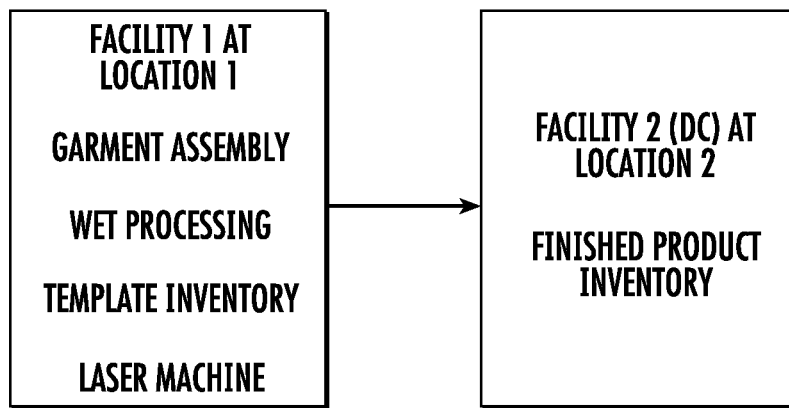
FIGS. 21-23 show various approaches for staging the base fit fabrics or base templates.
Figure 22:
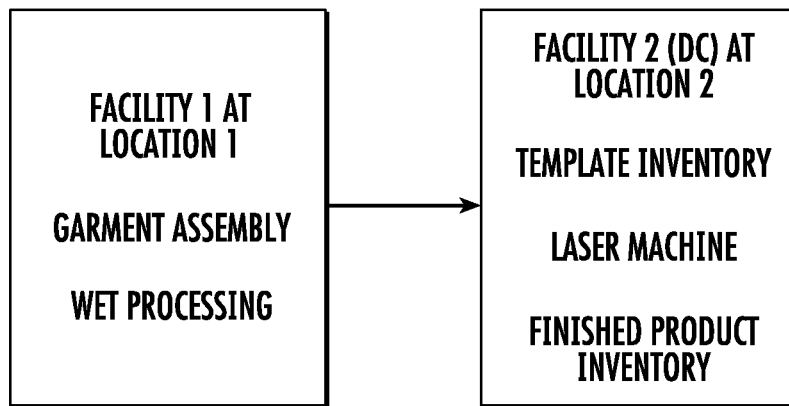
Figure 23:
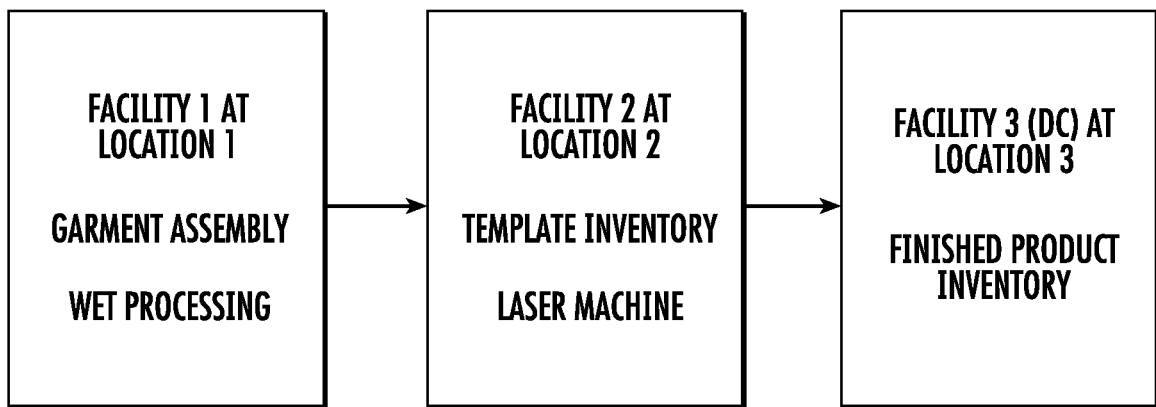

FIGS. 21-23 show various approaches for staging (e.g., storing inventory) the base fit fabrics or base templates. In FIG. 21, there is a first facility at a first location and a second facility at a second location, different from each other (in different buildings). The second facility may be referred to as a distribution center and stores an inventory of the finished products. As an example, the first facility can be in China or Asia. The second facility can be in the United States (e.g., distribution center for the U.S. market).

The first facility is handles assembling the garments, wet processing (e.g., base wash), storing an inventory of the base templates, lasering of the garment by a laser finishing machine when needed. The finished product, output from the laser machine, is shipped to the second facility for inventorying.

In FIG. 22, compared to the approach in FIG. 21, the first facility no longer stores the blank template inventory, but ships the templates after base wash to the second facility. The second facility stores an inventory of the base templates, and has laser machines that can laser finish the garments. The resulting finished products are also inventoried at the second facility. In this approach, the time from finished product to store is shortened (compared to the approach in FIG. 21) because typically the second facility (e.g., distribution center) is closer to, for example, the retail stores and location of the purchasers. This approach may be considered in-market final finishing because laser finishing occurs in the same location as the market the facility serves.

In FIG. 23, compared to the approaches in FIGS. 21 and 22, there are three facilities. The third facility is a distribution center (similar to the second facilities in FIGS. 21 and 22) and stores the finished products. The second facility handles storing inventory of the base templates and lasering of the garments. The first facility handles assembling the garments and base wash. The first facility ships the base templates to the second facility, which inventories them. After lasering, the second facility ships the finished products to the third facility.

As an example, the first facility can be in China or Asia. The second facility can be in Mexico, or other location geographically closer to the third facility than the first facility. The third facility can be in the United States (e.g., distribution center for the U.S. market).

In an implementation, a system includes: a first garment product, second garment product, digital design tool, and a laser finishing machine. The first garment is identifiable by a first product code identifier. The first garment product is made from a first garment template washed using a first base wash recipe. The first garment template is an assembled garment made from fabric panels of a woven first material comprising a warp yarn including indigo-dyed cotton yarn, and the fabric panels are sewn together using thread.

The second garment product is identifiable by a second product code identifier. The second garment product is made from a second garment template washed using a second base wash recipe, different from the first base wash recipe. The second garment template is an assembled garment made from fabric panels of the woven first material comprising a warp yarn comprising indigo-dyed cotton yarn, and the fabric panels are sewn together using thread.

The digital design tool is used to generate or produce one or more laser files, including a first laser file for a first finishing pattern. The digital design tool generates a visualization of a finishing pattern on a computer screen and allows editing of the finishing pattern.

The laser finishing machine receives as input the first laser file that is generated by the digital design tool. When the first garment template is used as a target garment for a laser head of the laser finishing machine and the first laser file controls operation of the laser head, the laser finishing machine burns the first finishing pattern on the target garment, which results in the target garment becoming the first garment product. When the second garment template is used as the target garment for the laser head of the laser finishing machine and the first laser file controls operation of the laser head, the laser finishing machine burns the finishing pattern on the target garment, which results in the target garment becoming the second garment product.

In various implementations, the first product code identifier is different from the second product code identifier. The first material is a denim. The first garment product can be a first pair of jeans product. The second garment product can be a second pair of jeans product.

The first base wash recipe can result in a lighter colored apparel template than the second base wash recipe. For example, the first base wash recipe may include more oxidizer (e.g., sodium hypochlorite) that chemically oxidizes the material or fabric of the assembled apparel. Of the first base wash recipe may include abrasives (e.g., pumice) that abrades the surface of the material.

The system can further include: a third garment product, identifiable by a third product code identifier, where the third garment product is made from the first garment template. The digital design tool generates a second laser file including a second finishing pattern, different from the first finishing pattern. The laser finishing machine receives as input the second laser file that is generated by the digital design tool. When the first garment template is used as the target garment for the laser head of the laser finishing machine and the second laser file controls operation of the laser head, the laser finishing machine burns the second finishing pattern on the target garment, which results in the target garment becoming the third garment product.

The system can include: a third garment product, identifiable by a third product code identifier, where the third garment product is made from the first garment template; and a fourth garment product, identifiable by a fourth product code identifier, where the fourth garment product is made from the second garment template. The digital design tool generates a second laser file including a second finishing pattern, different from the first finishing pattern. The laser finishing machine receives as input the second laser file that is generated by the digital design tool.

When the first garment template is used as the target garment for the laser head of the laser finishing machine and the second laser file controls operation of the laser head, the laser finishing machine burns the second finishing pattern on the target garment, which results in the target garment becoming the third garment product. When the second garment template is used as the target garment for the laser head of the laser finishing machine and the second laser file controls operation of the laser head, the laser finishing machine burns the second finishing pattern on the target garment, which results in the target garment becoming the fourth garment product.

The laser finishing machine can be housed in a processing facility including machines used to perform the first and second base wash recipes. The first and second garment products are stored at a distribution center. The processing facility and distribution center are separate buildings in different locations. A template inventory including the first garment template and second garment template are stored at the processing facility.

The laser finishing machine can be housed in a dry processing facility. The first and second garment products are stored at a distribution center. The dry processing facility and distribution center are separate buildings in different locations. A template inventory including the first garment template and second garment template are stored at the dry processing facility. The dry processing facility does not include machines used to perform the first and second base wash recipes.

The laser finishing machine can be housed in a dry processing facility. The first and second garment products are stored at a distribution center. The dry processing facility and distribution center are in the same building at the same location. A template inventory including the first garment template and second garment template are stored at the distribution center.

The system can include a server, connected to a user digital design tool and laser finishing machine via a network. A user accesses the user digital design tool at the server via the Web (e.g., the Internet or the Cloud) and creates a user laser file with a customized laser finishing pattern. The user selects a template from a template library to which the customized laser finishing pattern. The laser finishing machine receives as input the user laser file. When the user's selected garment template is used as the target garment for the laser head of the laser finishing machine and the user laser file controls operation of the laser head, the laser finishing machine burns the customized finishing pattern on the target garment, which results in the target garment becoming a customized product for the user.

In another implementation, a method includes: providing a first garment template washed using a first base wash recipe, where the first garment template is an assembled garment made from fabric panels of a woven first material comprising a warp yarn comprising indigo-dyed cotton yarn, and the fabric panels are sewn together using thread; providing a second garment template washed using a second base wash recipe, where the second garment template is an assembled garment made from fabric panels of a woven first material comprising a warp yarn comprising indigo-dyed cotton yarn, and the fabric panels are sewn together using thread; providing a first laser file including a first finishing pattern; and inputting the first laser file to a laser finishing machine to burn the first finishing pattern onto the first garment template to obtain a first finished garment.

The method further includes: indicating the first finished garment as a first garment product, identifiable by a first product code identifier; inputting the first laser file to the laser finishing machine to burn the first finishing pattern onto the second garment template to obtain a second finished garment; and indicating the second finished garment as a second garment product, identifiable by a second product code identifier, different form the first product code identifier.

In various implementations, the method can include: providing a second laser file including a second finishing pattern, different from the first finishing pattern; inputting the second laser file to the laser finishing machine to burn the second finishing pattern onto the first garment template to obtain a third finished garment; and indicating the third finished garment as a third garment product, identifiable by a third product code identifier, different from the first and second product code identifiers.

The method can include: providing a second laser file including a second finishing pattern, different from the first finishing pattern; inputting the second laser file to the laser finishing machine to burn the second finishing pattern onto the first garment template to obtain a third finished garment; indicating the third finished garment as a third garment product, identifiable by a third product code identifier; inputting the second laser file to the laser finishing machine to burn the second finishing pattern onto the second garment template to obtain a fourth finished garment; and indicating the fourth finished garment as a fourth garment product, identifiable by a fourth product code identifier, different from the fourth product code identifier.

The first base wash recipe can result in a lighter colored (or darker colored) apparel template than the second base wash recipe.

A first inventory of the first and second garment template can be stored in a first facility at a first location. The first and second finished garments are stored in a second inventory at a second facility at a second location. The first and second facilities are different buildings in different locations.

A first inventory of the first and second garment template can be stored in a first facility at a first location, the first and second finished garments are stored in a second inventory at the first facility. The laser finishing machine and burning of the finishing patterns also occurs at the first facility.

The providing a first garment template washed using a first base wash recipe can include washing an assembled garment first base wash recipe to obtain the first garment template at a first facility at a first location. The method can include: shipping the first garment template to a second facility at a second location, different from the first facility, and storing an inventory the first garment template at the second facility. The second facility can house the laser finishing machine. The second facility can store an inventory of the first garment product.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A system comprising:
a first garment product, identifiable by a first product code identifier, wherein the first garment product is made from a first garment template washed using a first base wash recipe, the first garment template is an assembled garment made from fabric panels of a woven first material comprising a warp yarn comprising indigo-dyed cotton yarn, and the fabric panels are sewn together using thread;
a second garment product, identifiable by a second product code identifier, wherein the second garment product is made from a second garment template washed using a second base wash recipe, different from the first base wash recipe, the second garment template is an assembled garment made from fabric panels of the woven first material comprising a warp yarn comprising indigo-dyed cotton yarn, and the fabric panels are sewn together using thread;
a third garment product, identifiable by a third product code identifier, wherein the third garment product is made from the first garment template, and the first, second, and third product code identifiers are different from each other;
a digital design tool, generating a first laser file including a first finishing pattern and a second laser file including a second finishing pattern, wherein the digital design tool generates a visualization of a finishing pattern on a computer screen and allows editing of the finishing pattern;
a laser finishing machine, receiving as input at least one of the first laser file or the second laser file that is generated by the digital design tool,
when the first garment template is used as a target garment for a laser head of the laser finishing machine and the first laser file controls operation of the laser head, the laser finishing machine burns the first finishing pattern on the target garment, which results in the target garment becoming the first garment product,
when the second garment template is used as the target garment for the laser head of the laser finishing machine and the first laser file controls operation of the laser head, the laser finishing machine burns the finishing pattern on the target garment, which results in the target garment becoming the second garment product, and
when the first garment template is used as the target garment for the laser head of the laser finishing machine and the second laser file controls operation of the laser head, the laser finishing machine burns the second finishing pattern on the target garment, which results in the target garment becoming the third garment product.

2. The system of claim 1 comprising:
a fourth garment product, identifiable by a fourth product code identifier, wherein the fourth garment product is made from the second garment template, and the fourth product code identifier is different from the first, second, and third product code identifiers, and
when the second garment template is used as the target garment for the laser head of the laser finishing machine and the second laser file controls operation of the laser head, the laser finishing machine burns the second finishing pattern on the target garment, which results in the target garment becoming the fourth garment product.

3. The system of claim 1 wherein the laser finishing machine is housed in a processing facility including machines used to perform the first and second base wash recipes, and the first and second garment products are stored at a distribution center, and the processing facility and distribution center are separate buildings in different locations, and
a template inventory including the first garment template and second garment template are stored at the processing facility.

4. The system of claim 1 wherein the laser finishing machine is housed in a dry processing facility, and the first and second garment products are stored at a distribution center, and the dry processing facility and distribution center are separate buildings in different locations, and
a template inventory including the first garment template and second garment template are stored at the dry processing facility.

5. The system of claim 4 wherein the dry processing facility does not include machines used to perform the first and second base wash recipes.

6. The system of claim 1 wherein the laser finishing machine is housed in a dry processing facility, the first and second garment products are stored at a distribution center, and the dry processing facility and distribution center are in the same building at the same location, and
a template inventory including the first garment template and second garment template are stored at the distribution center.

7. The system of claim 1 wherein the editing allowed by the digital design tool comprises altering a position of the finishing pattern relative to the garment on the computer screen.

8. The system of claim 1 wherein the digital design tool allows editing comprising altering a scaling of the finishing pattern relative to the garment on the computer screen.

9. The system of claim 1 wherein the digital design tool allows editing comprising applying a tint to the finishing pattern and garment on the computer screen.

10. The system of claim 1 wherein the digital design tool allows editing comprising altering a position of the finishing pattern relative to the garment on the computer screen, and altering a scaling of the finishing pattern relative to the garment on the computer screen.

11. The system of claim 1 wherein the digital design tool allows editing comprising altering a position of the finishing pattern relative to the garment on the computer screen, and altering a scaling of the finishing pattern relative to the garment on the computer screen.

12. The system of claim 1 wherein the digital design tool allows editing comprising altering a scaling of the finishing pattern relative to the garment on the computer screen, and applying a tint to the finishing pattern and garment on the computer screen.

13. The system of claim 1 wherein the digital design tool allows editing comprising altering an opacity of the finishing pattern relative to the garment.

14. The system of claim 1 wherein the digital design tool allows editing comprising editing adjusting a bright point of the finishing pattern that changes a midpoint in a grayscale mapping of the finishing pattern.

15. The system of claim 1 wherein the digital design tool allows editing comprising
at least one of adding a damage asset to the finishing pattern and garment, altering a position of the damage asset relative to the finishing pattern and the garment, or altering a scaling of the damage asset relative to the finishing pattern and the garment, and
the damage asset comprises a hole or rip, and a visualization of the damage asset is of the damage asset after a postlaser wash.

16. The system of claim 15 wherein the visualization of the damage asset is created by
creating a black object for the damage asset before lasering on a screen,
burning the black object on a material using a laser to obtain the damage asset after lasering but before postlaser wash,
washing the material with damage asset in a postlaser wash to obtain the damage asset after postlaser wash, and
capturing an image of the damage asset after postlaser wash and using this image in the visualization of the damage asset by the digital design tool.

17. The system of claim 1 wherein the digital design tool executes on a tablet computer that is separate from the laser finishing machine.

18. The system of claim 1 wherein the digital design tool generates a visualization in color on a computer screen of the finishing pattern on a garment after a postlaser wash.

19. A system comprising:
a first garment product, identifiable by a first product code identifier, wherein the first garment product is made from a first garment template washed using a first base wash recipe, the first garment template is an assembled garment made from fabric panels of a woven first material comprising a warp yarn comprising indigo-dyed cotton yarn, and the fabric panels are sewn together using thread;
a second garment product, identifiable by a second product code identifier, wherein the second garment product is made from a second garment template washed using a second base wash recipe, different from the first base wash recipe, the second garment template is an assembled garment made from fabric panels of the woven first material comprising a warp yarn comprising indigo-dyed cotton yarn, and the fabric panels are sewn together using thread;
a third garment product, identifiable by a third product code identifier, wherein the third garment product is made from the first garment template, and the first, second, and third product code identifiers are different from each other;
a digital design tool, generating a first laser file including a first finishing pattern and a second laser file including a second finishing pattern, wherein the digital design tool generates a visualization in color on a computer screen and allows editing of a finishing pattern on a garment after postlaser wash, and
the digital design tool allows editing comprising at least one of altering a position of the finishing pattern relative to the garment on the computer screen, altering a scaling of the finishing pattern relative to the garment on the computer screen, or applying a tint to the finishing pattern and garment on the computer screen;

a laser finishing machine, receiving as input at least one of the first laser file or the second laser file that is generated by the digital design tool, when the first garment template is used as a target garment for a laser head of the laser finishing machine and the first laser file controls operation of the laser head, the laser finishing machine burns the first finishing pattern on the target garment, which results in the target garment becoming the first garment product, when the second garment template is used as the target garment for the laser head of the laser finishing machine and the first laser file controls operation of the laser head, the laser finishing machine burns the finishing pattern on the target garment, which results in the target garment becoming the second garment product, and when the first garment template is used as the target garment for the laser head of the laser finishing machine and the second laser file controls operation of the laser head, the laser finishing machine burns the second finishing pattern on the target garment, which results in the target garment becoming the third garment product.

20. The system of claim 19 wherein the digital design tool allows editing comprising at least one of adding a damage asset to the finishing pattern and garment, altering a position of the damage asset relative to the finishing pattern and the garment, or altering a scaling of the damage asset relative to the finishing pattern and the garment, and the damage asset comprises a hole or rip, and a visualization of the damage asset is of the damage asset after a postlaser wash.

* * * * *